(12) United States Patent
Garcia et al.

(10) Patent No.: US 7,996,174 B2
(45) Date of Patent: *Aug. 9, 2011

(54) DISK DRIVE TESTING

(75) Inventors: Edward Garcia, Holbrook, MA (US); Brian S. Merrow, Harvard, MA (US); Evgeny Polyakov, Brookline, MA (US); Walter Vahey, Winchester, MA (US); Eric L. Truebenbach, Sudbury, MA (US)

(73) Assignee: Teradyne, Inc., North Reading, MA (US)

( * ) Notice: Subject to any disclaimer, the term of this patent is extended or adjusted under 35 U.S.C. 154(b) by 577 days.

This patent is subject to a terminal disclaimer.

(21) Appl. No.: 11/958,788

(22) Filed: Dec. 18, 2007

(65) Prior Publication Data
US 2009/0153992 A1 Jun. 18, 2009

(51) Int. Cl.
*G01M 7/00* (2006.01)
(52) U.S. Cl. ........................................................ 702/115
(58) Field of Classification Search .................... 702/56, 702/108, 115, 122, 130, 132, 182; 360/31, 360/32, 39
See application file for complete search history.

(56) References Cited

U.S. PATENT DOCUMENTS

| | | | |
|---|---|---|---|
| 557,186 A | 3/1896 | Cahill | |
| 2,224,407 A | 12/1940 | Passur | |
| 2,380,026 A | 7/1945 | Clarke | |
| 2,631,775 A | 3/1953 | Gordon | |
| 2,635,524 A | 4/1953 | Jenkins | |
| 3,120,166 A | 2/1964 | Lyman | 98/39 |
| 3,360,032 A | 12/1967 | Sherwood | |
| 3,364,838 A | 1/1968 | Bradley | |
| 3,517,601 A | 6/1970 | Courchesne | |
| 3,845,286 A | 10/1974 | Aronstein et al. | |
| 4,147,299 A * | 4/1979 | Freeman | 236/49.5 |
| 4,233,644 A | 11/1980 | Hwang et al. | 361/384 |
| 4,336,748 A | 6/1982 | Martin et al. | 98/33 |
| 4,379,259 A | 4/1983 | Varadi et al. | 324/73 |
| 4,477,127 A | 10/1984 | Kume | 312/8 |
| 4,495,545 A | 1/1985 | Dufresne et al. | 361/384 |
| 4,526,318 A | 7/1985 | Fleming et al. | 236/49 |
| 4,620,248 A | 10/1986 | Gitzendanner | |
| 4,648,007 A | 3/1987 | Garner | 361/384 |
| 4,654,732 A | 3/1987 | Mesher | |
| 4,665,455 A | 5/1987 | Mesher | |

(Continued)

FOREIGN PATENT DOCUMENTS
AU 583716 5/1989
(Continued)

OTHER PUBLICATIONS

Bakken et al., "Low Cost, Rack Mounted, Direct Access Disk Storage Device", www.ip.com, 4 pages, Mar. 3, 2005.

(Continued)

*Primary Examiner* — Michael Nghiem
(74) *Attorney, Agent, or Firm* — Fish & Richardson P.C.

(57) ABSTRACT

A disk drive testing system includes at least one robotic arm defining a first axis substantially normal to a floor surface. The robotic arm is operable to rotate through a predetermined arc about and extend radially from the first axis. Multiple racks are arranged around the robotic arm for servicing by the robotic arm. Each rack houses multiple test slots that are each configured to receive a disk drive transporter configured to carry a disk drive for testing.

31 Claims, 15 Drawing Sheets

U.S. PATENT DOCUMENTS

| | | | |
|---|---|---|---|
| 4,683,424 A | 7/1987 | Cutright et al. | |
| 4,685,303 A | 8/1987 | Branc et al. | 62/3 |
| 4,688,124 A | 8/1987 | Scribner et al. | |
| 4,713,714 A | 12/1987 | Gatti et al. | 360/137 |
| 4,739,444 A | 4/1988 | Zushi et al. | 361/383 |
| 4,754,397 A | 6/1988 | Varaiya et al. | 364/200 |
| 4,768,285 A | 9/1988 | Woodman, Jr. | |
| 4,778,063 A | 10/1988 | Ueberreiter | |
| 4,801,234 A | 1/1989 | Cedrone | |
| 4,809,881 A | 3/1989 | Becker | |
| 4,817,273 A | 4/1989 | Lape et al. | |
| 4,817,934 A | 4/1989 | McCormick et al. | |
| 4,851,965 A | 7/1989 | Gabuzda et al. | 361/383 |
| 4,881,591 A | 11/1989 | Rignall | 165/26 |
| 4,888,549 A | 12/1989 | Wilson et al. | 324/73 R |
| 4,911,281 A | 3/1990 | Jenkner | |
| 4,967,155 A | 10/1990 | Magnuson | 324/212 |
| 5,012,187 A | 4/1991 | Littlebury | 324/158 |
| 5,045,960 A | 9/1991 | Eding | |
| 5,061,630 A | 10/1991 | Knopf et al. | 435/290 |
| 5,119,270 A | 6/1992 | Bolton et al. | 361/384 |
| 5,122,914 A | 6/1992 | Hanson | 360/98.01 |
| 5,127,684 A | 7/1992 | Klotz et al. | 292/113 |
| 5,128,813 A | 7/1992 | Lee | |
| 5,136,395 A | 8/1992 | Ishii et al. | |
| 5,158,132 A | 10/1992 | Guillemot | 165/30 |
| 5,168,424 A | 12/1992 | Bolton et al. | 361/384 |
| 5,171,183 A | 12/1992 | Pollard et al. | 454/184 |
| 5,173,819 A | 12/1992 | Takahashi et al. | 360/97.03 |
| 5,176,202 A | 1/1993 | Richard | 165/48.1 |
| 5,205,132 A | 4/1993 | Fu | |
| 5,206,772 A | 4/1993 | Hirano et al. | |
| 5,207,613 A | 5/1993 | Ferchau et al. | 454/184 |
| 5,210,680 A | 5/1993 | Scheibler | 361/384 |
| 5,237,484 A | 8/1993 | Ferchau et al. | 361/689 |
| 5,263,537 A | 11/1993 | Plucinski et al. | 165/97 |
| 5,269,698 A | 12/1993 | Singer | 439/157 |
| 5,295,392 A | 3/1994 | Hensel et al. | |
| 5,309,323 A | 5/1994 | Gray et al. | 361/726 |
| 5,325,263 A | 6/1994 | Singer et al. | 361/683 |
| 5,349,486 A | 9/1994 | Sugimoto et al. | 360/97.01 |
| 5,368,072 A | 11/1994 | Cote | 137/872 |
| 5,374,395 A | 12/1994 | Robinson et al. | |
| 5,379,229 A | 1/1995 | Parsons et al. | |
| 5,398,058 A | 3/1995 | Hattori | |
| 5,412,534 A | 5/1995 | Cutts et al. | 361/695 |
| 5,414,591 A | 5/1995 | Kimura et al. | 361/695 |
| 5,426,581 A | 6/1995 | Kishi et al. | |
| 5,469,037 A | 11/1995 | McMurtrey, Sr. et al. | 318/626 |
| 5,477,416 A | 12/1995 | Schkrohowsky et al. | 361/695 |
| 5,484,012 A | 1/1996 | Hiratsuka | 165/40 |
| 5,486,681 A | 1/1996 | Dagnac et al. | |
| 5,491,610 A | 2/1996 | Mok et al. | 361/695 |
| 5,543,727 A | 8/1996 | Bushard et al. | |
| 5,546,250 A | 8/1996 | Diel | 360/97.02 |
| 5,557,186 A | 9/1996 | McMurtrey, Sr. et al. | 318/626 |
| 5,563,768 A | 10/1996 | Perdue | 361/695 |
| 5,570,740 A | 11/1996 | Flores et al. | |
| 5,593,380 A | 1/1997 | Bittikofer | |
| 5,601,141 A | 2/1997 | Gordon et al. | 165/263 |
| 5,604,662 A | 2/1997 | Anderson et al. | 361/685 |
| 5,610,893 A | 3/1997 | Soga et al. | 369/84 |
| 5,617,430 A | 4/1997 | Angelotti et al. | |
| 5,644,705 A | 7/1997 | Stanley | 395/183.18 |
| 5,646,918 A | 7/1997 | Dimitri et al. | |
| 5,654,846 A | 8/1997 | Wicks et al. | 360/97.01 |
| 5,673,029 A | 9/1997 | Behl et al. | 340/635 |
| 5,694,290 A | 12/1997 | Chang | 361/685 |
| 5,718,627 A | 2/1998 | Wicks | 454/68 |
| 5,718,628 A | 2/1998 | Nakazato et al. | 454/184 |
| 5,731,928 A | 3/1998 | Jabbari et al. | |
| 5,751,549 A | 5/1998 | Eberhardt et al. | 361/687 |
| 5,754,365 A | 5/1998 | Beck et al. | |
| 5,761,032 A | 6/1998 | Jones | 361/685 |
| 5,793,610 A | 8/1998 | Schmitt et al. | 361/695 |
| 5,811,678 A | 9/1998 | Hirano | 73/461 |
| 5,812,761 A | 9/1998 | Seki et al. | 395/185.07 |
| 5,819,842 A | 10/1998 | Potter et al. | 165/206 |
| 5,831,525 A | 11/1998 | Harvey | 340/507 |
| 5,851,143 A | 12/1998 | Hamid | 454/57 |
| 5,859,409 A | 1/1999 | Kim et al. | 219/400 |
| 5,859,540 A | 1/1999 | Fukumoto | 324/760 |
| 5,862,037 A | 1/1999 | Behl | 361/687 |
| 5,870,630 A | 2/1999 | Reasoner et al. | 395/894 |
| 5,886,639 A | 3/1999 | Behl et al. | 340/635 |
| 5,890,959 A | 4/1999 | Pettit et al. | 454/184 |
| 5,912,799 A | 6/1999 | Grouell et al. | 361/685 |
| 5,913,926 A | 6/1999 | Anderson et al. | 714/6 |
| 5,914,856 A | 6/1999 | Morton et al. | 361/690 |
| 5,917,676 A * | 6/1999 | Browning | 360/97.01 |
| 5,927,386 A | 7/1999 | Lin | 165/80.3 |
| 5,956,301 A | 9/1999 | Dimitri et al. | |
| 5,959,834 A | 9/1999 | Chang | 361/685 |
| 5,999,356 A | 12/1999 | Dimitri et al. | |
| 5,999,365 A | 12/1999 | Hasegawa et al. | 360/97.02 |
| 6,000,623 A | 12/1999 | Blatti et al. | 236/49.3 |
| 6,005,404 A | 12/1999 | Cochran et al. | 324/760 |
| 6,005,770 A | 12/1999 | Schmitt | 361/695 |
| 6,008,636 A | 12/1999 | Miller et al. | |
| 6,008,984 A | 12/1999 | Cunningham et al. | 361/685 |
| 6,011,689 A | 1/2000 | Wrycraft | 361/695 |
| 6,031,717 A | 2/2000 | Baddour et al. | 361/687 |
| 6,034,870 A | 3/2000 | Osborn et al. | 361/690 |
| 6,042,348 A | 3/2000 | Aakalu et al. | 417/423.5 |
| 6,045,113 A | 4/2000 | Itakura | |
| 6,055,814 A | 5/2000 | Song | |
| 6,066,822 A | 5/2000 | Nemoto et al. | |
| 6,067,225 A | 5/2000 | Reznikov et al. | 361/685 |
| 6,069,792 A | 5/2000 | Nelik | 361/687 |
| 6,084,768 A | 7/2000 | Bolognia | 361/685 |
| 6,094,342 A * | 7/2000 | Dague et al. | 361/679.33 |
| 6,104,607 A | 8/2000 | Behl | 361/687 |
| 6,115,250 A | 9/2000 | Schmitt | 361/695 |
| 6,122,131 A | 9/2000 | Jeppson | |
| 6,122,232 A | 9/2000 | Schell et al. | |
| 6,124,707 A | 9/2000 | Kim et al. | 324/158.1 |
| 6,130,817 A | 10/2000 | Flotho et al. | 361/685 |
| 6,144,553 A | 11/2000 | Hileman et al. | 361/687 |
| 6,166,901 A | 12/2000 | Gamble et al. | 361/685 |
| 6,169,413 B1 | 1/2001 | Pack et al. | 324/760 |
| 6,169,930 B1 | 1/2001 | Blachek et al. | |
| 6,177,805 B1 | 1/2001 | Pih | 324/754 |
| 6,178,835 B1 | 1/2001 | Orriss et al. | 73/865.9 |
| 6,181,557 B1 | 1/2001 | Gatti | 361/695 |
| 6,185,065 B1 | 2/2001 | Hasegawa et al. | 360/97.02 |
| 6,185,097 B1 | 2/2001 | Behl | 361/695 |
| 6,188,191 B1 | 2/2001 | Frees et al. | |
| 6,192,282 B1 | 2/2001 | Smith et al. | |
| 6,193,339 B1 | 2/2001 | Behl et al. | 312/223.2 |
| 6,209,842 B1 | 4/2001 | Anderson et al. | 248/560 |
| 6,227,516 B1 | 5/2001 | Webster, Jr. et al. | 248/694 |
| 6,229,275 B1 | 5/2001 | Yamamoto | |
| 6,231,145 B1 | 5/2001 | Liu | 312/332.1 |
| 6,233,148 B1 | 5/2001 | Shen | |
| 6,236,563 B1 | 5/2001 | Buican et al. | 361/685 |
| 6,247,944 B1 | 6/2001 | Bolognia et al. | 439/157 |
| 6,249,824 B1 | 6/2001 | Henrichs | |
| 6,252,769 B1 | 6/2001 | Tullstedt et al. | 361/694 |
| 6,262,863 B1 | 7/2001 | Ostwald et al. | |
| 6,272,007 B1 | 8/2001 | Kitlas et al. | |
| 6,272,767 B1 | 8/2001 | Botruff et al. | |
| 6,281,677 B1 | 8/2001 | Cosci et al. | 324/212 |
| 6,282,501 B1 | 8/2001 | Assouad | 702/117 |
| 6,285,524 B1 | 9/2001 | Boigenzahn et al. | |
| 6,289,678 B1 | 9/2001 | Pandolfi | 62/3.2 |
| 6,297,950 B1 | 10/2001 | Erwin | 361/685 |
| 6,298,672 B1 | 10/2001 | Valicoff, Jr. | |
| 6,302,714 B1 | 10/2001 | Bolognia et al. | 439/157 |
| 6,304,839 B1 | 10/2001 | Ho et al. | 703/18 |
| 6,307,386 B1 | 10/2001 | Fowler et al. | |
| 6,327,150 B1 | 12/2001 | Levy et al. | 361/724 |
| 6,330,154 B1 | 12/2001 | Fryers et al. | 361/695 |
| 6,351,379 B1 | 2/2002 | Cheng | 361/685 |
| 6,354,792 B1 | 3/2002 | Kobayashi et al. | |
| 6,356,409 B1 | 3/2002 | Price et al. | 360/98.07 |
| 6,356,415 B1 | 3/2002 | Kabasawa | 360/256.3 |
| 6,384,995 B1 | 5/2002 | Smith | 360/31 |

| | | |
|---|---|---|
| 6,388,437 B1 | 5/2002 | Wolski et al. |
| 6,388,875 B1 | 5/2002 | Chen .......................... 361/685 |
| 6,388,878 B1 | 5/2002 | Chang ......................... 361/687 |
| 6,389,225 B1 | 5/2002 | Malinoski et al. ............ 392/479 |
| 6,411,584 B2 | 6/2002 | Davis et al. |
| 6,421,236 B1 | 7/2002 | Montoya et al. .............. 361/685 |
| 6,434,000 B1 | 8/2002 | Pandolfi ....................... 361/685 |
| 6,434,498 B1 | 8/2002 | Ulrich et al. ................. 702/115 |
| 6,434,499 B1 | 8/2002 | Ulrich et al. ................. 702/115 |
| 6,464,080 B1 | 10/2002 | Morris et al. ................ 306/591 |
| 6,467,153 B1 | 10/2002 | Butts et al. .................. 29/603.03 |
| 6,473,297 B1 | 10/2002 | Behl et al. .................... 361/685 |
| 6,473,301 B1 | 10/2002 | Levy et al. ................... 361/685 |
| 6,476,627 B1 | 11/2002 | Pelissier et al. .............. 324/760 |
| 6,477,044 B2 | 11/2002 | Foley et al. |
| 6,477,442 B1 | 11/2002 | Valerino, Sr. |
| 6,480,380 B1 | 11/2002 | French et al. ................ 361/690 |
| 6,480,382 B2 | 11/2002 | Cheng .......................... 361/695 |
| 6,487,071 B1 | 11/2002 | Tata et al. ..................... 361/685 |
| 6,489,793 B2 | 12/2002 | Jones et al. ................... 324/760 |
| 6,494,663 B2 | 12/2002 | Ostwald et al. |
| 6,525,933 B2 | 2/2003 | Eland ........................... 361/686 |
| 6,526,841 B1 | 3/2003 | Wanek et al. ................. 73/865.6 |
| 6,535,384 B2 | 3/2003 | Huang .......................... 361/695 |
| 6,537,013 B2 | 3/2003 | Emberty et al. |
| 6,544,309 B1 | 4/2003 | Hoefer et al. .................... 55/283 |
| 6,546,445 B1 | 4/2003 | Hayes ........................... 710/305 |
| 6,553,532 B1 | 4/2003 | Aoki |
| 6,560,107 B1 | 5/2003 | Beck et al. |
| 6,565,163 B2 | 5/2003 | Behl et al. .................... 312/223.1 |
| 6,565,859 B2 | 5/2003 | Wolski et al. ................ 324/158.1 |
| 6,567,266 B2 | 5/2003 | Ives et al. |
| 6,570,734 B2 | 5/2003 | Ostwald et al. |
| 6,577,586 B1 | 6/2003 | Yang et al. |
| 6,577,687 B2 | 6/2003 | Hall et al. |
| 6,618,254 B2 | 9/2003 | Ives |
| 6,626,846 B2 | 9/2003 | Spencer |
| 6,628,518 B2 | 9/2003 | Behl et al. ..................... 361/687 |
| 6,635,115 B1 | 10/2003 | Fairbairn et al. |
| 6,640,235 B1 | 10/2003 | Anderson ..................... 708/100 |
| 6,644,982 B1 | 11/2003 | Ondricek et al. |
| 6,651,192 B1 | 11/2003 | Viglione et al. ................. 714/47 |
| 6,654,240 B1 | 11/2003 | Tseng et al. ................... 361/685 |
| 6,679,128 B2 | 1/2004 | Wanek et al. ................. 73/865.6 |
| 6,693,757 B2 | 2/2004 | Hayakawa et al. ............. 360/69 |
| 6,741,529 B1 | 5/2004 | Getreuer |
| 6,746,648 B1 | 6/2004 | Mattila et al. |
| 6,751,093 B1 | 6/2004 | Hsu et al. ..................... 361/685 |
| 6,791,785 B1 | 9/2004 | Messenger et al. |
| 6,791,799 B2 | 9/2004 | Fletcher ....................... 360/255 |
| 6,798,651 B2 | 9/2004 | Syring et al. ................. 361/685 |
| 6,798,972 B1 | 9/2004 | Ito et al. |
| 6,801,834 B1 | 10/2004 | Konshak et al. |
| 6,806,700 B2 | 10/2004 | Wanek et al. ................ 324/158.1 |
| 6,811,427 B2 | 11/2004 | Garrett et al. ................. 439/378 |
| 6,826,046 B1 | 11/2004 | Muncaster et al. ............ 361/687 |
| 6,830,372 B2 | 12/2004 | Liu et al. ......................... 374/57 |
| 6,832,929 B2 | 12/2004 | Garrett et al. ................. 439/378 |
| 6,861,861 B2 | 3/2005 | Song et al. |
| 6,862,173 B1 | 3/2005 | Konshak et al. |
| 6,867,939 B2 | 3/2005 | Katahara et al. ................ 360/53 |
| 6,892,328 B2 | 5/2005 | Klein et al. ..................... 714/42 |
| 6,904,479 B2 | 6/2005 | Hall et al. |
| 6,908,330 B2 | 6/2005 | Garrett et al. ................. 439/378 |
| 6,928,336 B2 | 8/2005 | Peshkin et al. |
| 6,937,432 B2 | 8/2005 | Sri-Jayantha et al. ...... 360/97.01 |
| 6,957,291 B2 | 10/2005 | Moon et al. |
| 6,965,811 B2 | 11/2005 | Dickey et al. |
| 6,974,017 B2 | 12/2005 | Oseguera |
| 6,976,190 B1 | 12/2005 | Goldstone ...................... 714/42 |
| 6,980,381 B2 | 12/2005 | Gray et al. ...................... 360/31 |
| 6,982,872 B2 | 1/2006 | Behl et al. ..................... 361/687 |
| 7,006,325 B2 | 2/2006 | Emberty et al. |
| 7,039,924 B2 | 5/2006 | Goodman et al. |
| 7,054,150 B2 | 5/2006 | Orriss et al. ................... 361/685 |
| 7,070,323 B2 | 7/2006 | Wanek et al. ................... 374/45 |
| 7,076,391 B1 | 7/2006 | Pakzad et al. ................. 702/118 |
| 7,077,614 B1 | 7/2006 | Hasper et al. |
| 7,088,541 B2 | 8/2006 | Orriss et al. ..................... 360/71 |
| 7,092,251 B1 | 8/2006 | Henry ........................... 361/685 |
| 7,106,582 B2 | 9/2006 | Albrecht et al. ............... 361/685 |
| 7,123,477 B2 | 10/2006 | Coglitore et al. |
| 7,126,777 B2 | 10/2006 | Flechsig et al. .................. 360/59 |
| 7,130,138 B2 | 10/2006 | Lum et al. ........................ 360/31 |
| 7,134,553 B2 | 11/2006 | Stephens |
| 7,139,145 B1 * | 11/2006 | Archibald et al. ............... 360/53 |
| 7,164,579 B2 | 1/2007 | Muncaster et al. ............ 361/685 |
| 7,167,360 B2 | 1/2007 | Inoue et al. |
| 7,181,458 B1 | 2/2007 | Higashi |
| 7,203,021 B1 | 4/2007 | Ryan et al. |
| 7,203,060 B2 | 4/2007 | Kay et al. ....................... 361/685 |
| 7,206,201 B2 | 4/2007 | Behl et al. |
| 7,216,968 B2 | 5/2007 | Smith et al. |
| 7,219,028 B2 | 5/2007 | Bae et al. |
| 7,219,273 B2 | 5/2007 | Fisher et al. |
| 7,227,746 B2 | 6/2007 | Tanaka et al. ................. 361/685 |
| 7,232,101 B2 | 6/2007 | Wanek et al. ............. 248/346.06 |
| 7,243,043 B2 | 7/2007 | Shin |
| 7,248,467 B2 | 7/2007 | Sri-Jayantha et al. ........ 361/685 |
| 7,259,966 B2 | 8/2007 | Connelly, Jr. et al. ........ 361/727 |
| 7,273,344 B2 | 9/2007 | Ostwald et al. |
| 7,280,353 B2 | 10/2007 | Wendel et al. |
| 7,289,885 B2 | 10/2007 | Basham et al. |
| 7,304,855 B1 | 12/2007 | Milligan et al. |
| 7,315,447 B2 | 1/2008 | Inoue et al. |
| 7,349,205 B2 | 3/2008 | Hall et al. |
| 7,353,524 B1 | 4/2008 | Lin et al. |
| 7,385,385 B2 | 6/2008 | Magliocco et al. |
| 7,395,133 B2 | 7/2008 | Lowe |
| 7,403,451 B2 | 7/2008 | Goodman et al. |
| 7,437,212 B2 | 10/2008 | Farchmin et al. |
| 7,447,011 B2 | 11/2008 | Wade et al. |
| 7,457,112 B2 | 11/2008 | Fukuda et al. |
| 7,467,024 B2 | 12/2008 | Flitsch |
| 7,476,362 B2 | 1/2009 | Angros ......................... 422/100 |
| 7,483,269 B1 * | 1/2009 | Marvin et al. ............ 361/679.31 |
| 7,505,264 B2 | 3/2009 | Hall et al. |
| 7,554,811 B2 | 6/2009 | Scicluna et al. |
| 7,568,122 B2 | 7/2009 | Mechalke et al. |
| 7,570,455 B2 | 8/2009 | Deguchi et al. |
| 7,573,715 B2 | 8/2009 | Mojaver et al. |
| 7,584,851 B2 | 9/2009 | Hong et al. |
| 7,612,996 B2 | 11/2009 | Atkins et al. |
| 7,625,027 B2 | 12/2009 | Kiaie et al. |
| 7,630,196 B2 | 12/2009 | Hall et al. |
| 7,643,289 B2 | 1/2010 | Ye et al. |
| 7,646,596 B2 | 1/2010 | Ng |
| 7,729,107 B2 | 6/2010 | Atkins et al. ............. 361/679.02 |
| 2001/0006453 A1 | 7/2001 | Glorioso et al. ............... 361/685 |
| 2001/0044023 A1 | 11/2001 | Johnson et al. |
| 2001/0046118 A1 | 11/2001 | Yamanashi et al. ........... 361/687 |
| 2001/0048590 A1 | 12/2001 | Behl et al. |
| 2002/0030981 A1 | 3/2002 | Sullivan et al. |
| 2002/0044416 A1 | 4/2002 | Harmon, III et al. ......... 361/685 |
| 2002/0051338 A1 | 5/2002 | Jiang et al. |
| 2002/0071248 A1 | 6/2002 | Huang et al. .................. 361/685 |
| 2002/0079422 A1 | 6/2002 | Jiang |
| 2002/0090320 A1 | 7/2002 | Burow et al. |
| 2002/0116087 A1 | 8/2002 | Brown |
| 2002/0161971 A1 | 10/2002 | Dimitri et al. |
| 2002/0172004 A1 | 11/2002 | Ives et al. ...................... 361/685 |
| 2003/0035271 A1 | 2/2003 | Lelong et al. ................. 361/724 |
| 2003/0043550 A1 | 3/2003 | Ives ............................... 361/726 |
| 2003/0206397 A1 | 11/2003 | Allgeyer et al. ............... 361/685 |
| 2004/0062104 A1 * | 4/2004 | Muller et al. .................. 365/201 |
| 2004/0165489 A1 | 8/2004 | Goodman et al. |
| 2004/0230399 A1 | 11/2004 | Shin .............................. 702/182 |
| 2004/0236465 A1 | 11/2004 | Butka et al. |
| 2004/0264121 A1 | 12/2004 | Orriss et al. ................... 361/685 |
| 2005/0004703 A1 | 1/2005 | Christie, Jr. |
| 2005/0010836 A1 | 1/2005 | Bae et al. ......................... 714/25 |
| 2005/0018397 A1 | 1/2005 | Kay et al. ...................... 361/685 |
| 2005/0055601 A1 * | 3/2005 | Wilson et al. ..................... 714/5 |
| 2005/0057849 A1 | 3/2005 | Twogood et al. |
| 2005/0069400 A1 | 3/2005 | Dickey et al. |
| 2005/0109131 A1 | 5/2005 | Wanek et al. ................. 73/865.9 |
| 2005/0116702 A1 | 6/2005 | Wanek et al. ................ 324/158.1 |
| 2005/0131578 A1 | 6/2005 | Weaver |

| | | | | | |
|---|---|---|---|---|---|
| 2005/0179457 A1 | 8/2005 | Min et al. | EP | 0840476 | 5/1998 |
| 2005/0207059 A1 | 9/2005 | Cochrane | EP | 1 045 301 | 10/2000 |
| 2005/0219809 A1 | 10/2005 | Muncaster et al. ........... 361/685 | EP | 1 045 301 A | 10/2000 |
| 2005/0225338 A1 | 10/2005 | Sands et al. .................... 324/754 | EP | 1209557 | 5/2002 |
| 2005/0270737 A1 | 12/2005 | Wilson et al. ................. 361/685 | EP | 1 422 713 | 5/2004 |
| 2006/0023331 A1 | 2/2006 | Flechsig et al. | EP | 1422713 | 5/2004 |
| 2006/0028802 A1 | 2/2006 | Shaw et al. .................... 361/728 | EP | 1234308 | 5/2006 |
| 2006/0066974 A1 | 3/2006 | Akamatsu et al. | EP | 1 760 722 | 3/2007 |
| 2006/0130316 A1 | 6/2006 | Takase et al. ............. 29/603.09 | EP | 1760722 | 3/2007 |
| 2006/0190205 A1 | 8/2006 | Klein et al. | EP | 1612798 | 11/2007 |
| 2006/0227517 A1 | 10/2006 | Zayas et al. ................... 361/748 | GB | 2241118 | 8/1991 |
| 2006/0250766 A1 | 11/2006 | Blaalid et al. .................. 361/685 | GB | 2276275 | 9/1994 |
| 2006/0269384 A1* | 11/2006 | Kiaie et al. ............... 414/222.02 | GB | 2299436 | 10/1996 |
| 2007/0034368 A1 | 2/2007 | Atkins et al. ................... 165/247 | GB | 2 312 984 | 11/1997 |
| 2007/0035874 A1 | 2/2007 | Wendel et al. | GB | 2312984 | 11/1997 |
| 2007/0035875 A1 | 2/2007 | Hall et al. | GB | 2328782 | 3/1999 |
| 2007/0053154 A1 | 3/2007 | Fukuda et al. | GB | 2439844 | 7/2008 |
| 2007/0064383 A1* | 3/2007 | Tanaka et al. ................. 361/685 | JP | 61-115279 | 6/1986 |
| 2007/0082907 A1 | 4/2007 | Canada et al. | JP | 62-177621 | 8/1987 |
| 2007/0127202 A1 | 6/2007 | Scicluna et al. .............. 361/685 | JP | 62-239394 | 10/1987 |
| 2007/0127206 A1 | 6/2007 | Wade et al. ................... 361/687 | JP | 62-251915 | 11/1987 |
| 2007/0195497 A1 | 8/2007 | Atkins .......................... 361/685 | JP | 63-002160 | 1/1988 |
| 2007/0248142 A1 | 10/2007 | Rountree et al. | JP | 63-004483 | 1/1988 |
| 2007/0253157 A1* | 11/2007 | Atkins et al. .................. 361/685 | JP | 63-016482 | 1/1988 |
| 2007/0286045 A1 | 12/2007 | Onagi et al. | JP | 63-062057 | 3/1988 |
| 2008/0007865 A1 | 1/2008 | Orriss et al. .................. 360/97.01 | JP | 63-201946 | 8/1988 |
| 2008/0030945 A1 | 2/2008 | Majaver et al. | JP | 63-214972 | 9/1988 |
| 2008/0112075 A1 | 5/2008 | Farquhar et al. ........... 360/97.02 | JP | 63-269376 | 11/1988 |
| 2008/0239564 A1 | 10/2008 | Farquhar et al. ........... 360/97.02 | JP | 64-089034 | 4/1989 |
| 2008/0282275 A1 | 11/2008 | Zaczek et al. | JP | 2-091565 | 3/1990 |
| 2008/0282278 A1 | 11/2008 | Barkley | JP | 2-098197 | 4/1990 |
| 2009/0028669 A1 | 1/2009 | Rebstock | JP | 2-185784 | 7/1990 |
| 2009/0082907 A1 | 3/2009 | Stuvel et al. | JP | 2-199690 | 8/1990 |
| 2009/0109622 A1* | 4/2009 | Parish et al. .................. 361/699 | JP | 2-278375 | 11/1990 |
| 2009/0122443 A1 | 5/2009 | Farquhar et al. ........... 360/97.01 | JP | 2-297770 | 12/1990 |
| 2009/0142169 A1* | 6/2009 | Garcia et al. ............. 414/222.02 | JP | 3-008086 | 1/1991 |
| 2009/0153992 A1 | 6/2009 | Garcia et al. | JP | 3-078160 | 4/1991 |
| 2009/0153993 A1* | 6/2009 | Garcia et al. .................... 360/31 | JP | 3-105704 | 5/1991 |
| 2009/0153994 A1* | 6/2009 | Merrow et al. .................. 360/31 | JP | 3-207947 | 9/1991 |
| 2009/0175705 A1 | 7/2009 | Nakao et al. | JP | 3-210662 | 9/1991 |
| 2009/0261047 A1* | 10/2009 | Merrow ...................... 211/41.12 | JP | 3-212859 | 9/1991 |
| 2009/0261228 A1 | 10/2009 | Merrow | JP | 3-214490 | 9/1991 |
| 2009/0261229 A1* | 10/2009 | Merrow ......................... 248/560 | JP | 3-240821 | 10/1991 |
| 2009/0262444 A1 | 10/2009 | Polyakov et al. | JP | 3-295071 | 12/1991 |
| 2009/0262445 A1 | 10/2009 | Noble et al. | JP | 4-017134 | 1/1992 |
| 2009/0262454 A1* | 10/2009 | Merrow ........................ 360/97.02 | JP | 4-143989 | 5/1992 |
| 2009/0262455 A1* | 10/2009 | Merrow ........................ 360/97.02 | JP | 4-172658 | 6/1992 |
| 2009/0265032 A1 | 10/2009 | Toscano et al. | JP | 4-214288 | 8/1992 |
| 2009/0265043 A1* | 10/2009 | Merrow ............................ 700/299 | JP | 4-247385 | 9/1992 |
| 2009/0265136 A1 | 10/2009 | Garcia et al. | JP | 4-259956 | 9/1992 |
| 2009/0297328 A1 | 12/2009 | Slocum, III | JP | 4-307440 | 10/1992 |
| | | | JP | 4-325923 | 11/1992 |
| | FOREIGN PATENT DOCUMENTS | | JP | 5-035053 | 2/1993 |
| CN | 2341188 | 9/1999 | JP | 5-035415 | 2/1993 |
| CN | 1114109 | 7/2003 | JP | 5-066896 | 3/1993 |
| CN | 1177187 | 11/2004 | JP | 5-068257 | 3/1993 |
| CN | 1192544 | 3/2005 | JP | 5-073566 | 3/1993 |
| DE | 3786944 | 11/1993 | JP | 5-073803 | 3/1993 |
| DE | 69111634 | 5/1996 | JP | 5-101603 | 4/1993 |
| DE | 69400145 | 10/1996 | JP | 5-173718 | 7/1993 |
| DE | 19701548 | 8/1997 | JP | 5-189163 | 7/1993 |
| DE | 19804813 | 9/1998 | JP | 5-204725 | 8/1993 |
| DE | 69614460 | 6/2002 | JP | 5-223551 | 8/1993 |
| DE | 69626584 | 12/2003 | JP | 6-004220 | 1/1994 |
| DE | 19861388 | 8/2007 | JP | 6-004981 | 1/1994 |
| EP | 0210497 | 7/1986 | JP | 6-162645 | 6/1994 |
| EP | 0242970 | 10/1987 | JP | 6-181561 | 6/1994 |
| EP | 0 277 634 | 8/1988 | JP | 6-215515 | 8/1994 |
| EP | 0 277 634 A | 8/1988 | JP | 6-274943 | 9/1994 |
| EP | 0356977 | 8/1989 | JP | 6-314173 | 11/1994 |
| EP | 0442642 | 2/1991 | JP | 7-007321 | 1/1995 |
| EP | 0466073 | 7/1991 | JP | 7-029364 | 1/1995 |
| EP | 0776009 | 11/1991 | JP | 7-037376 | 2/1995 |
| EP | 0582017 | 2/1994 | JP | 7-056654 | 3/1995 |
| EP | 0617570 | 9/1994 | JP | 7-111078 | 4/1995 |
| EP | 0635836 | 1/1995 | JP | 7-115497 | 5/1995 |
| EP | 741508 | 11/1996 | JP | 7-201082 | 8/1995 |
| EP | 0757320 | 2/1997 | JP | 7-226023 | 8/1995 |
| EP | 0757351 | 2/1997 | JP | 7-230669 | 8/1995 |

| | | |
|---|---|---|
| JP | 7-257525 | 10/1995 |
| JP | 1982246 | 10/1995 |
| JP | 7-307059 | 11/1995 |
| JP | 8007994 | 1/1996 |
| JP | 8-030398 | 2/1996 |
| JP | 8-030407 | 2/1996 |
| JP | 8-079672 | 3/1996 |
| JP | 8-106776 | 4/1996 |
| JP | 8-110821 | 4/1996 |
| JP | 8-167231 | 6/1996 |
| JP | 8-212015 | 8/1996 |
| JP | 8-244313 | 9/1996 |
| JP | 8-263525 | 10/1996 |
| JP | 8-263909 | 10/1996 |
| JP | 8-297957 | 11/1996 |
| JP | 2553315 | 11/1996 |
| JP | 9-044445 | 2/1997 |
| JP | 9-064571 | 3/1997 |
| JP | 9-082081 | 3/1997 |
| JP | 2635127 | 7/1997 |
| JP | 9-306094 | 11/1997 |
| JP | 9-319466 | 12/1997 |
| JP | 10-040021 | 2/1998 |
| JP | 10-049365 | 2/1998 |
| JP | 10-064173 | 3/1998 |
| JP | 10-098521 | 4/1998 |
| JP | 2771297 | 7/1998 |
| JP | 10-275137 | 10/1998 |
| JP | 10-281799 | 10/1998 |
| JP | 10-320128 | 12/1998 |
| JP | 10-340139 | 12/1998 |
| JP | 2862679 | 3/1999 |
| JP | 11-134852 | 5/1999 |
| JP | 11-139839 | 5/1999 |
| JP | 2906930 | 6/1999 |
| JP | 11-203201 | 7/1999 |
| JP | 11-213182 | 8/1999 |
| JP | 11-327800 | 11/1999 |
| JP | 11-353128 | 12/1999 |
| JP | 11-353129 | 12/1999 |
| JP | 2000-056935 | 2/2000 |
| JP | 2000-066845 | 3/2000 |
| JP | 2000-112831 | 4/2000 |
| JP | 2000-113563 | 4/2000 |
| JP | 2000-114759 | 4/2000 |
| JP | 2000-125290 | 4/2000 |
| JP | 3052183 | 4/2000 |
| JP | 2000-132704 | 5/2000 |
| JP | 2000-149431 | 5/2000 |
| JP | 2000-228686 | 8/2000 |
| JP | 2000-235762 | 8/2000 |
| JP | 2000-236188 | 8/2000 |
| JP | 2000-242598 | 9/2000 |
| JP | 2000-278647 | 10/2000 |
| JP | 3097994 | 10/2000 |
| JP | 2000-305860 | 11/2000 |
| JP | 2001-005501 | 1/2001 |
| JP | 2001-023270 | 1/2001 |
| JP | 2001-100925 | 4/2001 |
| JP | 03-195697 | 8/2001 |
| JP | 2002-42446 | 2/2002 |
| JP | 2007-87498 | 4/2007 |
| JP | 2007-188615 | 7/2007 |
| JP | 2007-220184 | 8/2007 |
| JP | 2007-293936 | 11/2007 |
| JP | 2007-305206 | 11/2007 |
| JP | 2007-305290 | 11/2007 |
| JP | 2007-328761 | 12/2007 |
| JP | 2008-503824 | 2/2008 |
| KR | 10-1998-0035445 | 8/1998 |
| KR | 10-0176527 | 11/1998 |
| KR | 10-0214308 | 8/1999 |
| KR | 10-0403039 | 10/2003 |
| SG | 45223 | 1/1998 |
| TW | 387574 | 4/2000 |
| WO | WO 89/01682 | 8/1988 |
| WO | WO 97/06532 | 2/1997 |
| WO | WO 00/49487 | 2/2000 |
| WO | WO 00/67253 | 11/2000 |
| WO | WO 01/09627 | 2/2001 |
| WO | WO 01/41148 | 6/2001 |
| WO | WO 03/013783 | 2/2003 |
| WO | WO 03/021597 | 3/2003 |
| WO | WO 03/021598 | 3/2003 |
| WO | WO 03/067385 | 8/2003 |
| WO | WO 2004/006260 | 1/2004 |
| WO | WO 2004/114286 | 12/2004 |
| WO | WO 2005/024830 | 3/2005 |
| WO | WO 2005/024831 | 3/2005 |
| WO | WO 2005/109131 | 11/2005 |
| WO | WO 2006/030185 | 3/2006 |
| WO | WO 2006/048611 | 5/2006 |
| WO | WO 2006/100441 | 9/2006 |
| WO | WO 2006/100445 | 9/2006 |
| WO | WO 2007/031729 | 3/2007 |

OTHER PUBLICATIONS

Biber et al., "Disk Drive Drawer Thermal Management", Advances in Electronic Packaging vol. 1:43-46, 1995.

Chung et al., "Vibration Absorber for Reduction of the In-plane Vibration in an Optical Disk Drive", IEEE Transactions on Consumer Electronics, Vo. 48, May 2004.

FlexStar Technology, "A World of Storage Testing Solutions," http://www.flexstar.com, 1 page (1999).

FlexStar Technology, "Environment Chamber Products," http://www.flexstar.com, 1 page (1999).

FlexStar Technology, "FlexStar's Family of Products," http://www.flexstar.com, 1 page (1999).

Gurumurthi, "The Need for temperature-Aware Storage Systems", The Tenth Intersociety conference on Thermal and Thermomechanical Phenomena in Electronics, ITHERM pp. 387-394, 2006.

Gurumurthi et al., "Thermal Issues in Disk Drive Design: Challenges and Possible Solutions", ACM Transactions on Storage 2:41-73, Feb. 2006.

Lindner, "Disk drive mounting", IBM Technical Disclosure Brochure, vol. 16, No. 3, pp. 903-904, Aug. 1973.

Morgenstern, Micropolis Drives Target High-end Apps; Technology Provides Higher Uninterrupted Data Transfer. (Applications; Microdisk AV LS 3020 and 1050AV and 1760AV LT Stackable Hard Drive Systems) (Product Announcement) MacWeek, vol. 8, No. 6, p. 8; Feb. 7, 1994.

Morris, "Zero Cost Power and Cooling Monitor System", www.delphion.com/tdbs/tdb?order=94A+61950, 3 pages, Jan. 15, 2008.

Notification of Transmittal of The International Search Report and the Written Opinion of the International Searching Authority, or the Declaration, PCT/US2008/086181, 15 pages, Mar. 16, 2009.

Park, "Vibration and Noise Reduction of an Optical Disk Drive by Using a Vibration Absorber Methods and Apparatus for Securing Disk Drives in a Disk", IEEE Transactions on Consumer Electronics, vol. 48, Nov. 2002.

Ruwart et al., "Performance Impact of External Vibration on Consumer-grade and enterprise-class Disk Drives", Proceedings of the $22^{nd}$ IEEE/$13^{th}$ Goddard Conference on Mass Storage Systems and Technologies, 2005.

Seagate Product Marketing, "Seagate's Advanced Multidrive System (SAMS) Rotational Vibration Feature", Publication TP-229D, Feb. 2000.

Schroeder et al., "Disk Failures in the Real World: What does an MTTP of 1,000,000 hours mean to you?", In FAST'07: $5^{th}$ USENIX Conference on File and Storage Technologies, San Jose, CA, Feb. 14-16, 2007.

Schulze et al., "How Reliable is a Raid?," COMPCON Spring apos; 89. Thirty-Fouth IEEE Computer Society International Conference: Intellectual Leverage, Digest of papers; pp. 118-123, Feb. 27-Mar. 3, 1989.

Winchester, "Automation Specialists Use Machine Vision as a System Development Tool", IEE Computing & Control Engineering, Jun./Jul. 2003.

Xyratex website "Storage Infrastructure" www.xyratex.com/Products/storage-infrastructure/default.aspx 1995-2008.

"Xyratex to Debut its New Automated Test Solution for 2.5-Inch Disk Drives at DISKCON USA 2004" 2004 PR Newswire Europe www.prnewswire.co.uk/cgi/news/release?id=130103.

"Automated Production Test Solutions", Xyratex Product Test brochure, 2006.

Xyratex "Process Challenges in the Hard Drive Industry" slide presentation, 2006 Asian Diskcon.

Suwa et al., "Evaluation System for Residual Vibration from HDD Mounting Mechanism" IEEE Transactions on Magnetics, vol. 35, No. 2, pp. 868-873, Mar. 1999.

Suwa et al., "Rotational Vibration Suppressor" IBM Technical Disclosure Bulletin Oct. 1991.

Abraham et al., "Thermal Proximity Imaging of Hard-Disk Substrates", IEEE Transactions on Mathematics 36:3997-4004, Nov. 2000.

Anderson et al., "High Reliability Variable Load Time Controllable Vibration Free Thermal Processing Environment", Delphion, hhtps://www.delphion.com/tdbs/tdb?order=93A+63418, 3 pages, Mar. 18, 2009.

Asbrand, "Engineers at One Company Share the Pride and the Profits of Successful Product Design", Professional Issues, 4 pages, 1987.

Bair et al., "Measurements of Asperity Temperatures of a Read/Write Head Slider Bearing in Hard Magnetic Recording Disks", Journal of Tribology 113:547-554, Jul. 1991.

Christensen, "How Can Great firms Fail? Insights from the hard Disk Drive Industry", Harvard Business School Press, pp. 1-26, 2006.

Haddad et al., "A new Mounting Adapter for Computer Peripherals with Improved Reliability, Thermal Distribution, Low Noise and Vibration Reduction", ISPS, Advances in Information Storage and Processing Systems, 1:97-108, 1995.

HighBeam Research website "ACT debuts six-zone catalytic gas heater. (American Catalytic Technologies offers new heaters)" www.highbeam.com, 4 pages, 1998.

HighBeam Research website "Asynchronous Testing Increases Throughput." www.highbeam.com, 7 pages, 2000.

HighBeam Research website "Credence announces Production Release of the EPRO AQ Series for Integrated Test and Back-end Processing." www.highbeam.com, 4 pages, 1995.

HighBeam Research website "Test Multiple Parts At Once for Air Leaks. (Brief Article)", www.highbeam.com, 1 page, 1999.

Iwamiya, "Hard Drive Cooling Using a Thermoelectric Cooler", EEP-vol. 19-2, Advances in Electronic Packaging, vol. 2:2203-2208, ASME 1997.

Ku, "Investigation of Hydrodynamic Bearing Friction in Data Storage information System Spindle Motors", ISPSvol. 1, Advances in Information Storage and Processing Systems, pp. 159-165, ASME 1995.

McAuley, "Recursive Time Trapping for Synchronization of Product and Chamber Profiles for Stress Test", Delphion, www.delphion.com/tdb?order=88A+60957, 3 pages, Mar. 18, 2009.

Prater et al., "Thermal and Heat-Flow Aspects of Actuators for Hard Disk Drives", InterSociety Conference on Thermal Phenomena, pp. 261-268, 1994.

Terwiesch et al., "An Exploratory Study of International Product Transfer and Production Ramp-Up in the Data Storage Industry", The Information Storage Industry Center, University of California, www-irps.ucsd.edu/~sloan/, pp. 1-31, 1999.

Tzeng, "Dynamic Torque Characteriestics of Disk-Drive Spindle Bearings", ISPS-vol. 1, Advances in Information Storage and Processing Systems, pp. 57-63, ASME 1995.

Tzeng, "Measurements of Transient Thermal Strains in a Disk-Drive Actuator", InterSociety conference on Thermal Phenomena, pp. 269-274, 1994.

Wilson-7000 disk Drive Analyzer Product Literature, date accessed Jan. 28, 2009, 2 pages.

Notification of Transmittal of the International Search Report and the Written Opinion of the International Searching Authority, or the Declaration, for International Application No. PCT/US2009/039926, Sep. 1, 2009, 13 pages.

International Search Report and Written Opinion of the International Searching Authority in connection with International Application No. PCT/US2008/086814; dated Sep. 18, 2009. 50 Pages.

International Search Report and Written Opinion of International Searching Authority in connection with International Application No. PCT/US2008/086809; dated Sep. 17, 2009. 52 Pages.

Notification of Transmittal of the International Search Report and the Written Opinion of the International Searching Authority, or the Declaration, for International Application No. PCT/US2009/039591, Aug. 31, 2009, 10 pages.

Invitation to Pay Additional Fees and, Where Applicable, Protest Fee, PCT/US2008/086814, pp. 1-5, dated Mar. 4, 2009.

Invitation to Pay Additional Fees and, Where Applicable, Protest Fee, PCT/US2008/086809, pp. 1-6, dated Mar. 4, 2009.

Cardinal Intellectual Property's search report including the results of a search for the features of the claims included in the U.S. patent application entitled "Vibration Isolation Within Disk Drive Testing Systems", inventors: Brian S. Merrow and having assigned U.S. Appl. No. 12/767,142. The foregoing U.S. patent application is a continuation of U.S. Appl. No. 12/105,105. Revised as of Mar. 30, 2010.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/767,113. The foregoing U.S. patent application is a continuation of U.S. Appl. No. 11/959,133. Revised as of Apr. 4, 2010.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/766,680. The foregoing U.S. patent application is a continuation of U.S. Appl. No. 11/959,133. Revised as of Apr. 1, 2010.

Xyratex website "Storage Infrastructure" www.xyratex.com/Products/storage-infrastructure/default.aspx 1995-2008.

Xyratex website "Production Test Systems" www.xyratex.com/Products/production-test-systems/default.aspx 1995-2008.

Xyratex website "Single cell—Production Test Systems" www.xyratex.com/products/production-test-systems/single-cell.aspx 1995-2008.

Xyratex website "Continuous Innovation—Production Test Systems" www.xyratex.com/products/production-test-systerns/continuous-innovation.aspx 1995-2008.

Xyratex website "Key Advantages—Production Test Systems" www.xyratex.com/products/production-test-systems/advantages.aspx 1995-2008.

Xyratex website "Testing Drives Colder—Production Test Systems" www.xyratex.com/products/production-test-systems/colder.aspx 1995-2008.

U.S. Appl. No. 11/958,817, Office Action dated Mar. 19, 2010.

U.S. Appl. No. 11/958,817, Response to Office Action dated Mar. 19, 2010, Response filed Jun. 21, 2010.

Abramovitch, "Rejecting Rotational Disturbances on Small Disk Drives Using Rotational Accelerometers", Proceedings of the 1996 IFAC World Congress in San Francisco, CA, Jul. 1996 http://dabramovitch.com/pubs/amrfac_matj.pdf.

Ali et al., "Modeling and Simulation of Hard Disk Drive Final Assembly Using a HDD Template" Proceedings of the 2007 Winter Simulation Conference, IEEE pp. 1641-1650, 2007 http://portal.acm.org/citation.cfm?id=1351837.

Anderson et al., "Clinical chemistry: concepts and applications", The McGraw-Hill Companies, Inc., pp. 131-132, 2003.

Curtis et al., "InPhase Professional Archive Drive Architecture" Dec. 17, 2007 http://www.science.edu/TechoftheYear/Nominees/InPhase/Holographic%20Storage.pdf.

Findeis et al., "Vibration Isolation Techniques Sutiable for Portable Electronic Speckle Pattern Interferometry", Proc. SPIE vol. 4704, pp. 159-167, 2002 http://www.ndt.uct.ac.za/Papers/spiendt2002.pdf.

Frankovich, "The Basics of Vibration Isolation Using Elastomeric Materials", EARSC 2005 http://www.isoloss.com/pdfs/engineering/BasicsofVibrationIsolation.pdf.

Grochowski et al., "Future Trends in Hard Disk Drives" IEEE Transactions on Magnetics, vol. 32, No. 3, pp. 1850-1854, May, 1996 http://svn.tribler.org/abc/branches/leo/dataset/preferences/johan/johan-68.pdf.

Gurumurthi et al., "Disk Drive Roadmap from the Thermal Perspective: A Case for Dynamic Thermal Management", International Symposium on Computer Architecture Proceedings of the 32$^{nd}$ Annual International Symposium on Computer Architecture, pp. 38-49, 2005 http://portal.acm.org/citation.cfm?id=1069807.1069975.

Johnson et al., "Performance Measurements of Tertiary Storage Devices", Proceedings of the 24$^{th}$ VLDB Conference, New York, pp. 50-61, 1998.

Nagarajan, "Survey of Cleaning and cleanliness Measurement in Disk Drive Manufacture", North Carolina Department of Environment and Natural Resources, Feb. 1997.

Yee Leong Low et al., "Thermal network model for temperature prediction in hard disk drive" Journal Microsystem Technologies, vol. 15, No. 10-11, pp. 1653-1656, Oct. 2009 http://www.springerlink.com/content/20668jn67pk426r5/.

Annex to Form PCT/ASA/206 Communication Relating to the Results of the Partial International Search, for International Application No. PCT/US2008/086814, dated Apr. 3, 2009, 1 page.

Annex to Form PCT/ASA/206 Communication Relating to the Results of the Partial International Search, for International Application No. PCT/US2008/086809, dated Apr. 3, 2009, 1 page.

Notification of Transmittal of the International Search Report and the Written Opinion of the International Searching Authority, or the Declaration, for International Application No. PCT/US2008/086814, Sep. 18, 2009, 17 pages.

Notification of Transmittal of the International Search Report and the Written Opinion of the International Searching Authority, or the Declaration, for International Application No. PCT/US2009/039888, Sep. 28, 2009, 13 pages.

Notification of Transmittal of the International Search Report and the Written Opinion of the International Searching Authority, or the Declaration, for International Application No. PCT/US2009/039921, Sep. 25, 2009, 14 pages.

Notification of Transmittal of the International Search Report and the Written Opinion of the International Searching Authority, or the Declaration, for International Application No. PCT/US2009/040058, Sep. 29, 2009, 13 pages.

Notification of Transmittal of the International Search Report and the Written Opinion of the International Searching Authority, or the Declaration, for International Application No. PCT/US2009/040829, Oct. 28, 2009, 13 pages.

Notification of Transmittal of the International Search Report and the Written Opinion of the International Searching Authority, or the Declaration, for International Application No. PCT/US2009/039590, Oct. 30, 2009, 10 pages.

Notification of Transmittal of the International Search Report and the Written Opinion of the International Searching Authority, or the Declaration, for International Application No. PCT/US2009/040835, Oct. 30, 2009, 13 pages.

Notification of Transmittal of the International Search Report and the Written Opinion of the International Searching Authority, or the Declaration, for International Application No. PCT/US2009/040757, Nov. 23, 2009, 12 pages.

Notification of Transmittal of the International Search Report and the Written Opinion of the International Searching Authority, or the Declaration, for International Application No. PCT/US2009/039898, Nov. 24, 2009, 12 pages.

Notification of Transmittal of the International Search Report and the Written Opinion of the International Searching Authority, or the Declaration, for International Application No. PCT/US2009/040795, Nov. 26, 2009, 13 pages.

Notification of Transmittal of the International Search Report and the Written Opinion of the International Searching Authority, or the Declaration, for International Application No. PCT/US2009/045583, Nov. 27, 2009, 13 pages.

Notification of Transmittal of the International Search Report and the Written Opinion of the International Searching Authority, or the Declaration, for International Application No. PCT/US2009/040888, Dec. 29, 2009, 14 pages.

Notification of Transmittal of the International Search Report and the Written Opinion of the International Searching Authority, or the Declaration, for International Application No. PCT/US2009/040894, Dec. 22, 2009, 12 pages.

Notification of Transmittal of the International Search Report and the Written Opinion of the International Searching Authority, or the Declaration, for International Application No. PCT/US2009/039934, Dec. 23, 2009, 12 pages.

Notification of Transmittal of the International Search Report and the Written Opinion of the International Searching Authority, or the Declaration, for International Application No. PCT/US2009/040965, Dec. 23, 2009, 12 pages.

Notification of Transmittal of the International Search Report and the Written Opinion of the International Searching Authority, or the Declaration, for International Application No. PCT/US2009/040973, Jan. 11, 2010, 13 pages.

PCT International Preliminary Report on Patentability from corresponding International application No. PCT/US2008/086814, dated Apr. 1, 2010.

Exhibit 1 in *Xyratex Technology, LTD* v. *Teradyne, Inc.*; Newspaper picture that displays the CSO tester; 1990.

Exhibit 2 in *Xyratex Technology, LTD* v. *Teradyne, Inc.*; Photos of the CSO tester obtained from Hitachi; 1990.

Exhibit 1326 in *Xyratex Technology, LTD* v. *Teradyne, Inc.*; Image of the back of Exhibit 1 and Exhibit 2 photos, which display the photos' dates; 1990.

Exhibit 1314 in *Xyratex Technology, LTD.* v. *Teradyne, Inc.*; Case, "Last products of Disk-File Development at Hursley and Millbrook," IBM, Oct. 12, 1990.

Exhibit 1315 in *Xyratex Technology, LTD.* V. *Teradyne, Inc.*; Case, "History of Disk-File Development at Hursley and Millbrook," IBM, Oct. 17, 1990.

*Xyratex TeChnology, LTD.* V. *Teradyne, Inc.*, Teradyne, Inc's Prior Art Notice Pursuant to 35 U.S.C. Section 282. Case No. CV 08-04545 SJO (PLAx), Oct. 16, 2009.

*Xyratex TeChnology, LTD.* V. *Teradyne, Inc.*, Amended Joint Trial Exhibit List of Xyratex and Teradyne. Case No. CV 08-04545 SJO (PLAx), Nov. 12, 2009.

Notification of Transmittal of the International Search Report and the Written Opinion of the International Searching Authority, or the Declaration, for International Application No. PCT/GB2005/003490, Jan. 26, 2006, 10 pages.

Cardinal Intellectual Property's search report including the results of a search for the features of the claims included in the U.S. patent application entitled "Transferring Storage Devices Within Storage Device Testing Systems", inventors: John P. Toscano et al., and having assigned U.S. Appl. No. 12/727,201. The foregoing U.S. patent application is a continuation of U.S. Appl. No. 12/424,980. Search Report dated Jan. 4, 2010.

Cardinal Intellectual Property's search report including the results of a search for the features of the claims included in the U.S. patent application entitled "Processing Storage Devices", inventors: Richard W. Slocum III., and having assigned U.S. Appl. No. 12/727,619. The foregoing U.S. patent application is a continuation of U.S. Appl. No. 12/474,388. Search Report dated Jan. 5, 2010.

Cardinal Intellectual Property's search report including the results of a search for the features of the claims included in the U.S. patent application entitled "Bulk Feeding Disk Drives To Disk Drive Testing Systems", inventors: Noble et al., and having assigned U.S. Appl. No. 12/726,856. The foregoing U.S. patent application is a continuation of U.S. Appl. No. 12/104,869. Search Report dated Jan. 15, 2010.

Cardinal Intellectual Property's search report including the results of a search for the features of the claims included in the U.S. patent application entitled "Dependent Temperature Control Within Disk Drive Testing Systems", inventors: Merrow et al., and having assigned U.S. Appl. No. 12/727,207. The foregoing U.S. patent application is a continuation of U.S. Appl. No. 12/105,069. Search Report dated Jan. 13, 2010.

Cardinal Intellectual Property's search report including the results of a search for the features of the claims included in the U.S. patent application entitled "Test Slot Cooling System for a Storage Device Testing System", inventors: Merrow et al., and having assigned U.S. Appl. No. 12/727,700. The foregoing U.S. patent application is a continuation of U.S. Appl. No. 12/503,567. Search Report dated Jan. 13, 2010.

Cardinal Intellectual Property's search report including the results of a search for the features of the claims included in the U.S. patent application entitled "Storage Device Testing System Cooling", inventors: Brian S. Merrow and having assigned U.S. Appl. No. 12/775,560. The foregoing U.S. patent application is a continuation of U.S. Appl. No. 12/698,575. Search Report dated Feb. 17, 2010.

Cardinal Intellectual Property's search report including the results of a search for the features of the claims included in the U.S. patent application entitled "Conductive Heating" inventors: Brian S. Merrow et al., and having assigned U.S. Appl. No. 12/760,164. The foregoing U.S. patent application is a continuation of U.S. Appl. No. 12/503,593. Search Report dated Jan. 6, 2010.

Cardinal Intellectual Property's search report including the results of a search for the features of the claims included in the U.S. patent application entitled "Conductive Temperature Sensing", inventors: Brian S. Merrow et al., and having assigned U.S. Appl. No. 12/760,305. The foregoing U.S. patent application is a continuation of U.S. Appl. No. 12/503,687. Search Report dated Jan. 7, 2010.

Cardinal Intellectual Property's search report including the results of a search for the features of the claims included in the U.S. patent application entitled "Solid State Temperature Control of Hard Drive Tester", inventors: Brian S. Merrow and having assigned U.S. Appl. No. 12/856,056. The foregoing U.S. patent application is a continuation of U.S. Appl. No. 12/105,103. Search Report dated Jan. 14, 2010.

Cardinal Intellectual Property's search report including the results of a search for the features of the claims included in the U.S. patent application entitled "Single Test Slot for Dynamic Isolation of Hard Drive", inventors: Brian S. Merrow and having assigned U.S. Appl. No. 12/767,142. The foregoing U.S. patent application is a continuation of U.S. Appl. No. 12/105,105. Search Report dated Jan. 12, 2010.

Cardinal Intellectual Property's search report including the results of a search for the features of the claims included in the U.S. patent application entitled "Hard Drive Transport Sled", inventors: Brian S. Merrow et al., and having assigned U.S. Appl. No. 12/766,680. The foregoing U.S. patent application is a continuation of U.S. Appl. No. 12/959,133. Search Report dated Jan. 14, 2010.

U.S. Appl. No. 11/958,817, Office Action dated Aug. 24, 2010.

U.S. Appl. No. 11/958,817, Response to Office Action dated Aug. 24, 2010, Response filed Nov. 23, 2010.

* cited by examiner

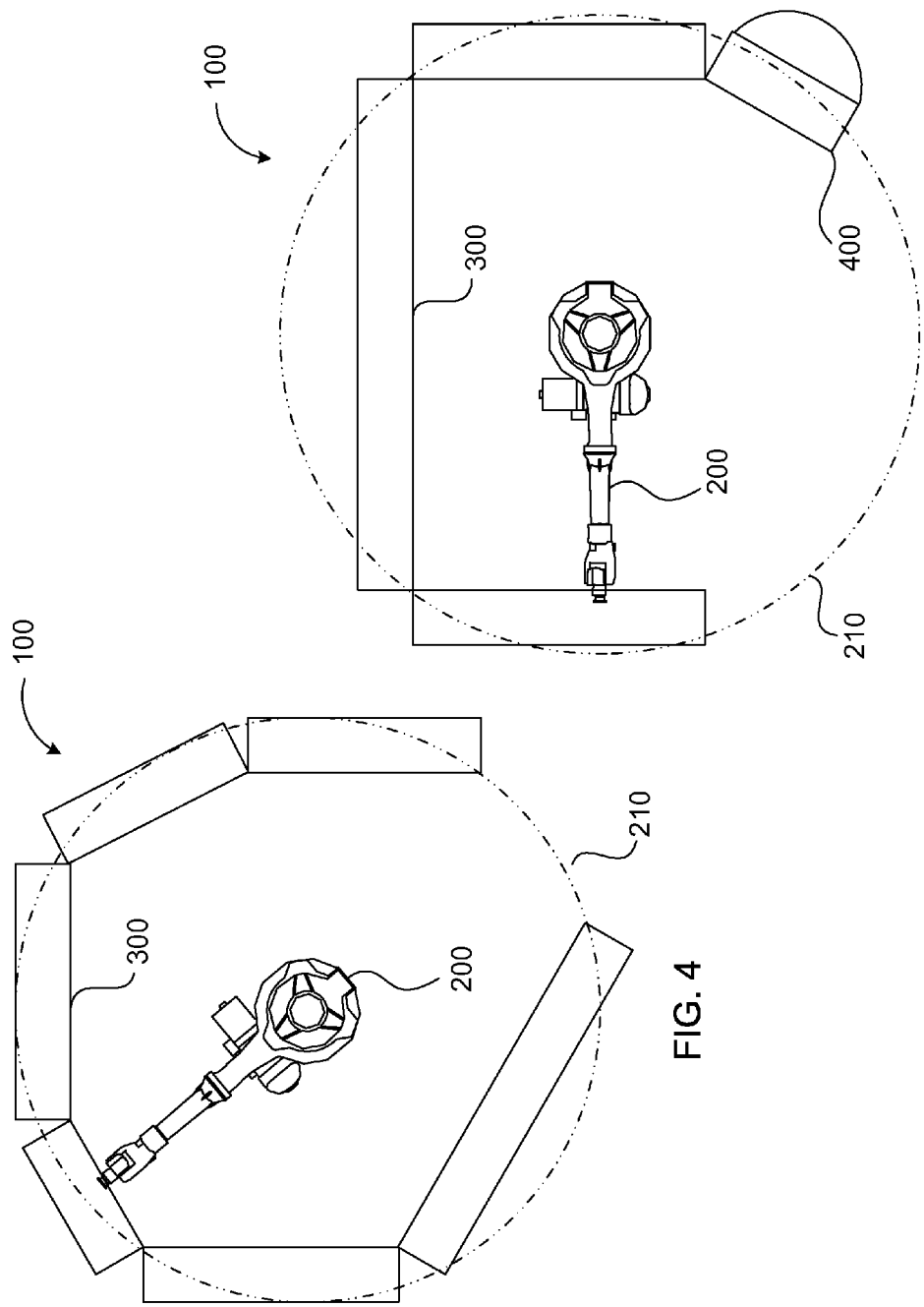

DISK DRIVE TESTING

TECHNICAL FIELD

This disclosure relates to disk drive testing.

BACKGROUND

Disk drive manufacturers typically test manufactured disk drives for compliance with a collection of requirements. Test equipment and techniques exist for testing large numbers of disk drives serially or in parallel. Manufacturers tend to test large numbers of disk drives simultaneously in batches. Disk drive testing systems typically include one or more racks having multiple test slots that receive disk drives for testing.

The testing environment immediately around the disk drive is closely regulated. Minimum temperature fluctuations in the testing environment are critical for accurate test conditions and for safety of the disk drives. The latest generations of disk drives, which have higher capacities, faster rotational speeds and smaller head clearance, are more sensitive to vibration. Excess vibration can affect the reliability of test results and the integrity of electrical connections. Under test conditions, the drives themselves can propagate vibrations through supporting structures or fixtures to adjacent units. This vibration "cross-talking," together with external sources of vibration, contributes to bump errors, head slap and non-repetitive run-out (NRRO), which may result in lower test yields and increased manufacturing costs.

Current disk drive testing systems employ automation and structural support systems that contribute to excess vibrations in the system and/or require large footprints. Current disk drive testing systems also use an operator or conveyer belt to individually feed disk drives to the testing system for testing.

SUMMARY

In one aspect, a disk drive testing system includes at least one robotic arm defining a first axis substantially normal to a floor surface. The robotic arm is operable to rotate through a predetermined arc (e.g. 360°) about, and to extend radially from, the first axis. Multiple racks are arranged around the robotic arm for servicing by the robotic arm. Each rack houses multiple test slots that are each configured to receive a disk drive transporter configured to carry a disk drive for testing.

Implementations of the disclosure may include one or more of the following features. In some implementations, the robotic arm includes a manipulator configured to engage the disk drive transporter of one of the test slots. The robotic arm is operable to carrying a disk drive in the disk drive transporter to the test slot for testing. The robotic arm defines a substantially cylindrical working envelope volume, and the racks and the transfer station are arranged within the working envelope volume for servicing by the robotic arm. In some examples, the racks and the transfer station are arranged in at least a partially closed polygon about the first axis of the robotic arm. The racks may be arranged equidistantly radially away from the first axis of the robotic arm or at different distances.

The robotic arm may independently services each test slot by retrieving the disk drive transporter from one of the test slots to transfer a disk drive between a transfer station and the test slot. In some implementations, the disk drive testing system includes a vertically actuating support that supports the robotic arm and is operable to move the robotic arm vertically with respect to the floor surface. The disk drive testing system may also include a linear actuator that supports the robotic arm and is operable to move the robotic arm horizontally along the floor surface. In some implementations, the disk drive testing system includes a rotatable table that supports the robotic arm and is operable to rotate the robotic arm about a second axis substantially normal to the floor surface.

The disk drive testing system may include a transfer station arranged for servicing by the robotic arm. The transfer station is configured to supply and/or store disk drives for testing. In some implementations, the transfer station is operable to rotate about a longitudinal axis defined by the transfer station substantially normal to a floor surface. The transfer station includes a transfer station housing that defines first and second opposite facing tote receptacles. In some examples, the transfer station includes a station base, a spindle extending upwardly substantially normal from the station base, and multiple tote receivers rotatably mounted on the spindle. Each tote receiver is independently rotatable of the other and defines first and second opposite facing tote receptacles.

The robotic arm may independently service each test slot by transferring a disk drive between a received disk drive tote of the transfer station and the test slot. In some implementations, the disk drive tote includes a tote body defining multiple disk drive receptacles configured to each house a disk drive. Each disk drive receptacle defines a disk drive support configured to support a central portion of a received disk drive to allow manipulation of the disk drive along non-central portions. In some examples, the disk drive tote includes a tote body defining multiple column cavities and multiple cantilevered disk drive supports disposed in each column cavity (e.g. off a rear wall of the cavity column), dividing the column cavity into multiple disk drive receptacles that are each configured to receive a disk drive. Each disk drive support is configured to support a central portion of a received disk drive to allow manipulation of the disk drive along non-central portions.

The disk drive testing system sometimes includes a vision system disposed on the robotic arm to aiding guidance of the robotic arm while transporting a disk drive. In particular, the vision system may used to guide a manipulator on the robotic arm that holds the disk drive transporter to insert the disk drive transporter safely into one of the test slots or a disk drive tote. The vision system may calibrate the robotic arm by aligning the robotic arm to a fiducial mark on the rack, test slot, transfer station, and/or disk drive tote.

In some implementations, the disk drive testing system includes at least one computer in communication with the test slots. A power system supplies power to the disk drive testing system and may be configured to monitor and/or regulate power to the received disk drive in the test slot. A temperature control system controls the temperature of each test slot. The temperature control system may include an air mover (e.g. fan) operable to circulate air over and/or through the test slot. A vibration control system controls rack vibrations (e.g. via passive dampening). A data interface is in communication with each test slot and is configured to communicate with a disk drive in the disk drive transporter received by the test slot.

Each rack may include at least one self-testing system in communication with at least one test slot. The self-testing system includes a cluster controller, a connection interface circuit in electrical communication with a disk drive received in the test slot, and a block interface circuit in electrical communication with the connection interface circuit. The block interface circuit is configured to control power and temperature of the test slot. The connection interface circuit and the block interface circuit are configured to test the functionality of at least one component of the disk drive testing system (e.g. test the functionality of the test slot while empty or while housing a disk drive held by a disk drive transporter).

In some implementations, each rack includes at least one functional testing system in communication with at least one test slot. The functional testing system includes a cluster controller, at least one functional interface circuit in electrical communication with the cluster controller, and a connection interface circuit in electrical communication with a disk drive received in the test slot and the functional interface circuit. The functional interface circuit is configured to communicate a functional test routine to the disk drive. In some examples, the functional testing system includes an Ethernet switch for providing electrical communication between the cluster controller and the at least one functional interface circuit.

In another aspect, a method of performing disk drive testing includes loading multiple disk drives into a transfer station (e.g. as by loading the disk drives into disk drive receptacles defined by a disk drive tote, and loading the disk drive tote into a tote receptacle defined by a transfer station). The method includes actuating a robotic arm to retrieve a disk drive transporter from a test slot housed in a rack, and actuating the robotic arm to retrieve one of the disk drives from the transfer station and carry the disk drive in the disk drive transporter. The robotic arm is operable to rotate through a predetermined arc about, and to extend radially from, a first axis defined by the robotic arm substantially normal to a floor surface. The method includes actuating the robotic arm to deliver the disk drive transporter carrying a disk drive to the test slot, and performing a functionality test on the disk drive housed by the received disk drive transporter and the test slot. The method then includes actuating the robotic arm to retrieve the disk drive transporter carrying the tested disk drive from the test slot and deliver the tested disk drive back to the transfer station.

In some examples, the method includes actuating the robotic arm to deposit the disk drive transporter in the test slot (e.g. after depositing the tested disk drive in a disk drive receptacle of the disk drive tote). In some examples, delivering the disk drive transporter to the test slot includes inserting the disk drive transporter carrying the disk drive into the test slot in the rack, establishing an electric connection between the disk drive and the rack.

In some implementations, performing a functionality test on the received disk drive includes regulating the temperature of the test slot while operating the disk drive. Also, operating the received disk drive may include performing reading and writing of data to the disk drive. In some examples, the method includes one or more of circulating air over and/or through the test slot to control the temperature of the test slot, monitoring and/or regulating power delivered to the received disk drive, and performing a self-test on the test slot with a self-testing system housed by the rack to verify the functionality of the test slot.

The method may include communicating with a vision system disposed on the robotic arm to aid guidance of the robotic arm while transporting the disk drive. The method may also include calibrating the robotic arm by aligning the robotic arm to a fiducial mark on the rack, test slot, transfer station, and/or disk drive tote recognized by the vision system.

The details of one or more implementations of the disclosure are set forth in the accompanying drawings and the description below. Other features, objects, and advantages will be apparent from the description and drawings, and from the claims.

DESCRIPTION OF DRAWINGS

FIGS. 4-5 are top views disk drive testing systems having different sized racks and footprints.

Like reference symbols in the various drawings indicate like elements.

DETAILED DESCRIPTION

Figure 1:
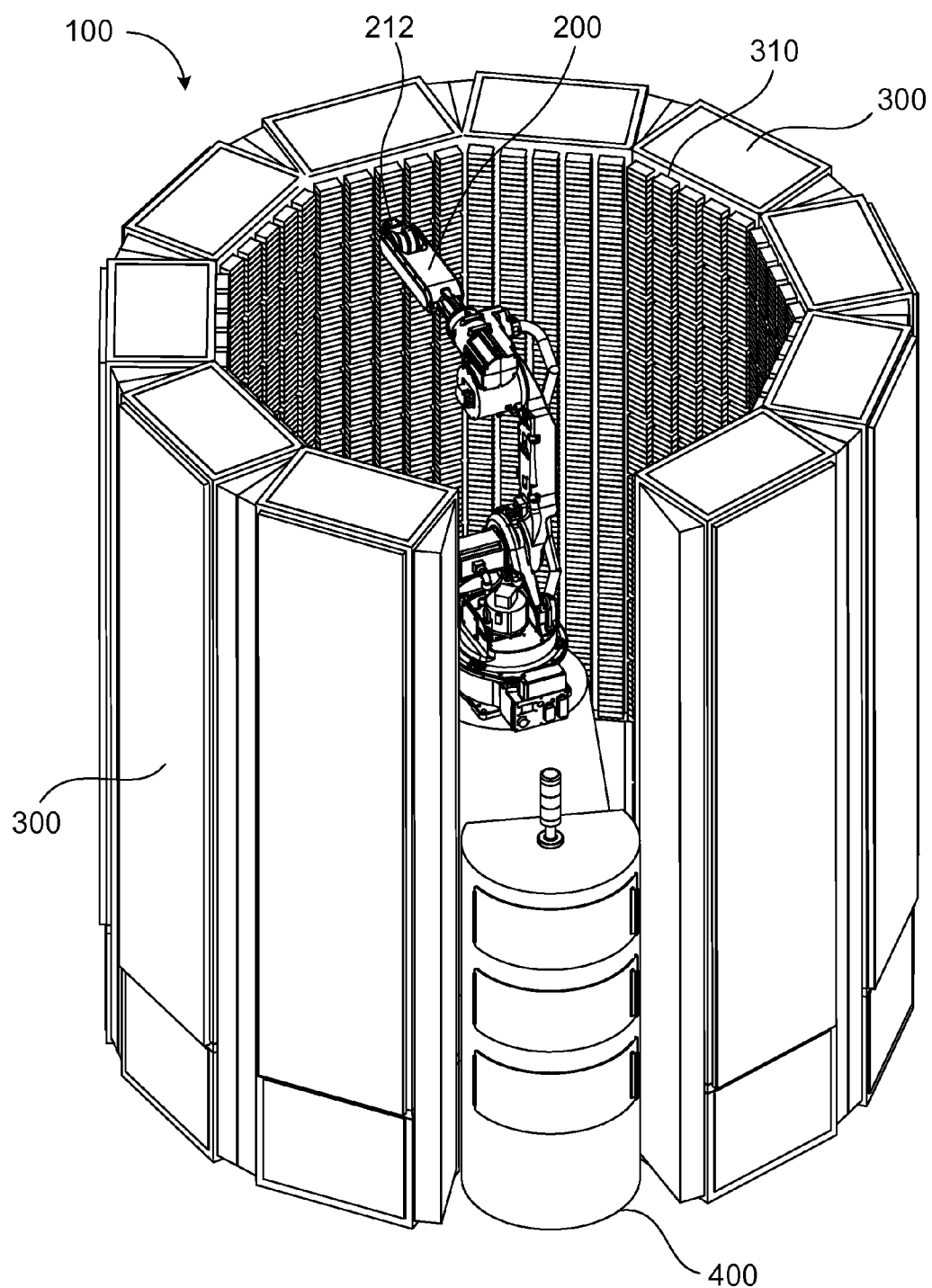
FIG. 1 is a perspective view of a disk drive testing system.
Figure 2:
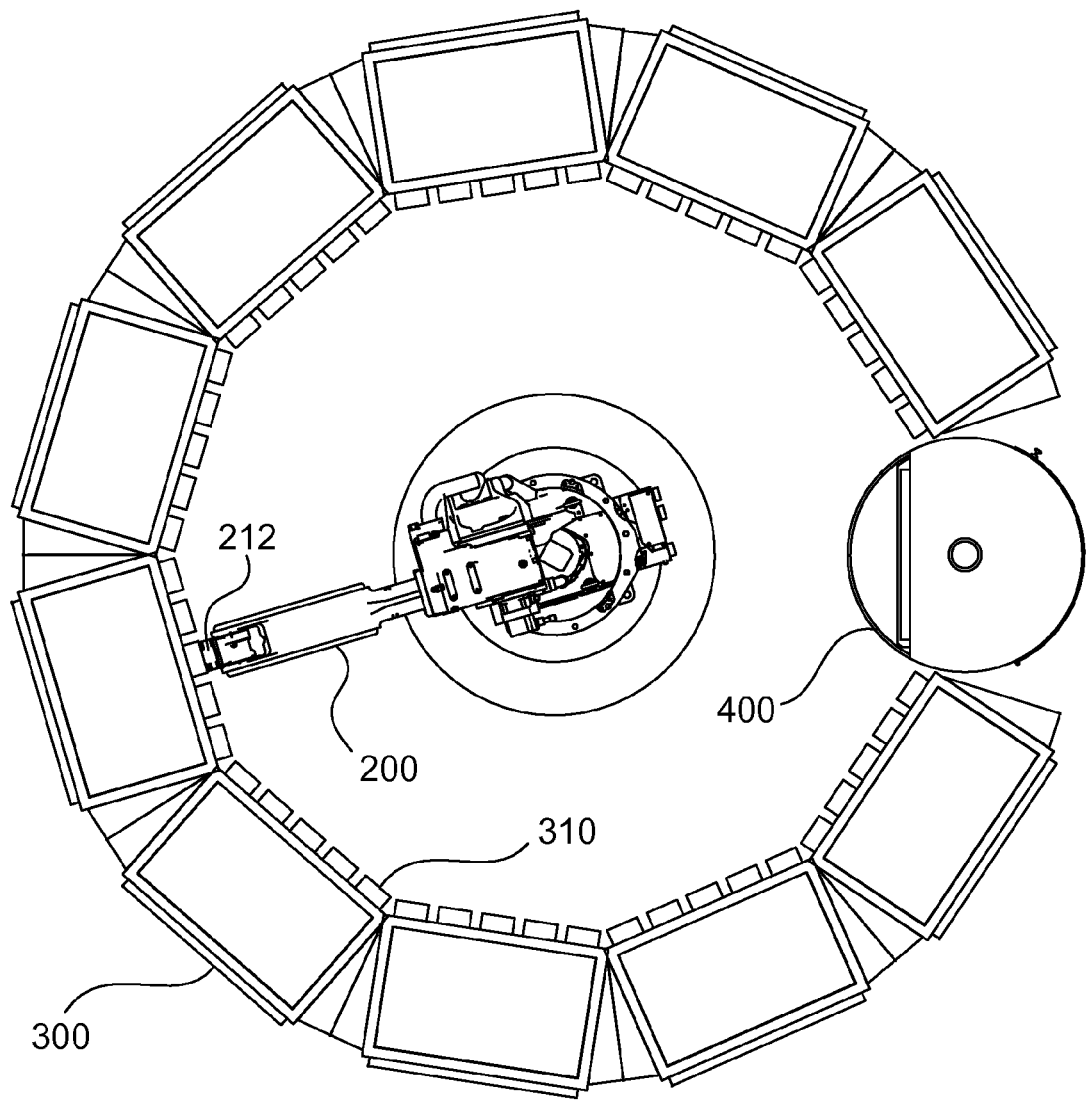
FIG. 2 is a top view of a disk drive testing system.
Figure 3:
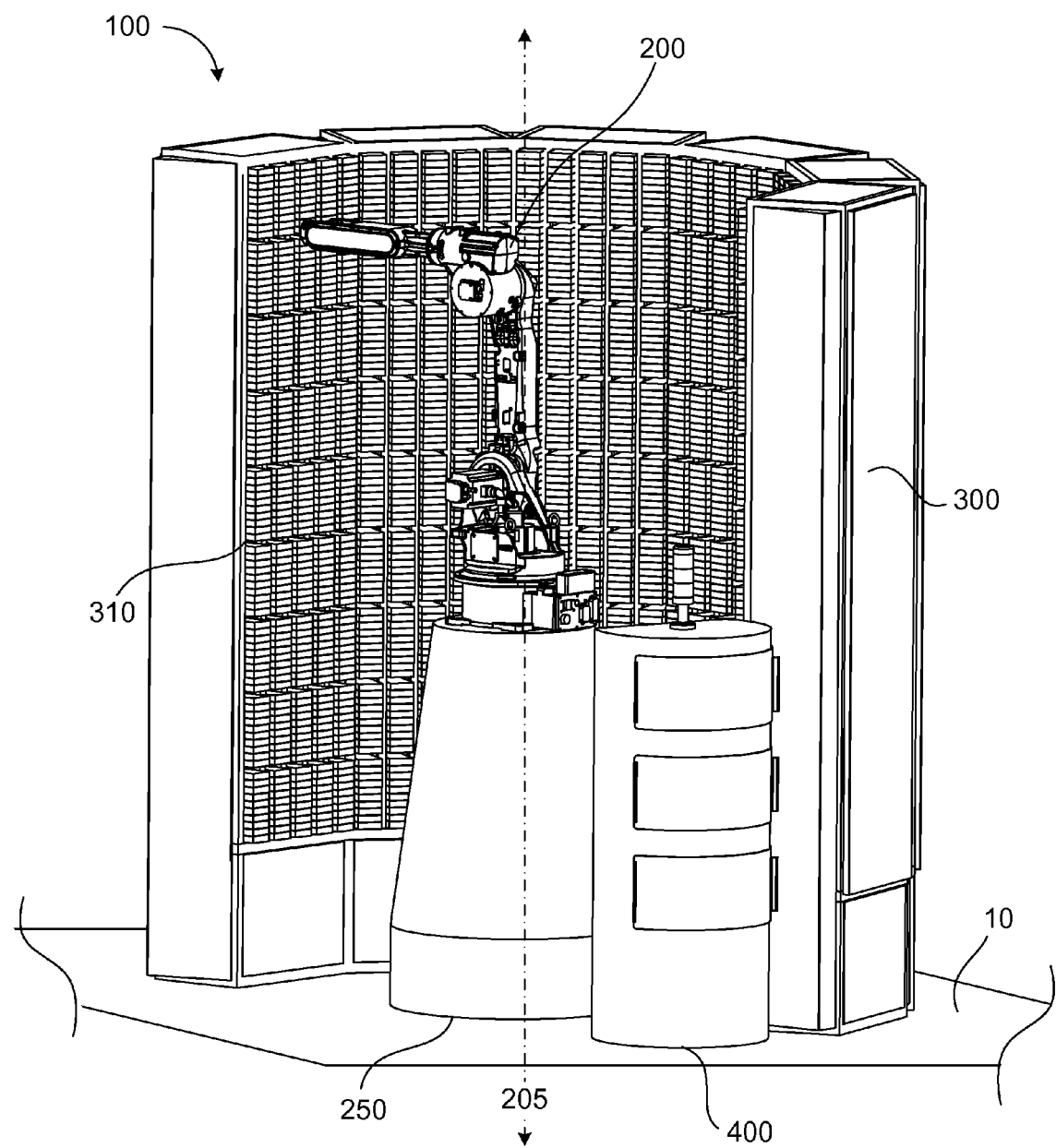
FIG. 3 is a perspective view of a disk drive testing system.

Referring to FIGS. 1-3, in some implementations, a disk drive testing system 100 includes at least one robotic arm 200 defining a first axis 205 substantially normal to a floor surface 10. The robotic arm 200 is operable to rotate through a predetermined arc about the first axis 205 and to extend radially from the first axis 205. In some examples, the robotic arm 200 is operable to rotate 360° about the first axis 205 and includes a manipulator 212 disposed at a distal end of the robotic arm 200 to handle a disk drive 500 and/or a disk drive transporter 550 carrying the disk drive 500 (see e.g. FIGS. 13-14). Multiple racks 300 are arranged around the robotic arm 200 for servicing by the robotic arm 200. Each rack 300 houses multiple test slots 310 configured to receive disk drives 500 for testing. The robotic arm 200 defines a substantially cylindrical working envelope volume 210, with the racks 300 being arranged within the working envelope volume 210 (see e.g. FIGS. 4 and 5) for accessibility of each test slot 310 for servicing by the robotic arm 200. The substantially cylindrical working envelope volume 210 provides a compact footprint and is generally only limited in capacity by height constraints.

The robotic arm 200 may be configured to independently service each test slot 310 to provide a continuous flow of disk drives 500 through the testing system 100. A continuous flow of individual disk drives 500 through the testing system 100 allows random start and stop times for each disk drive 500, whereas systems that require batches of disk drives 500 to be run at once must all have the same start and end times. Therefore, with continuous flow, disk drives 500 of different capacities can be run at the same time and serviced (loaded/unloaded) as needed.

Figure 10:
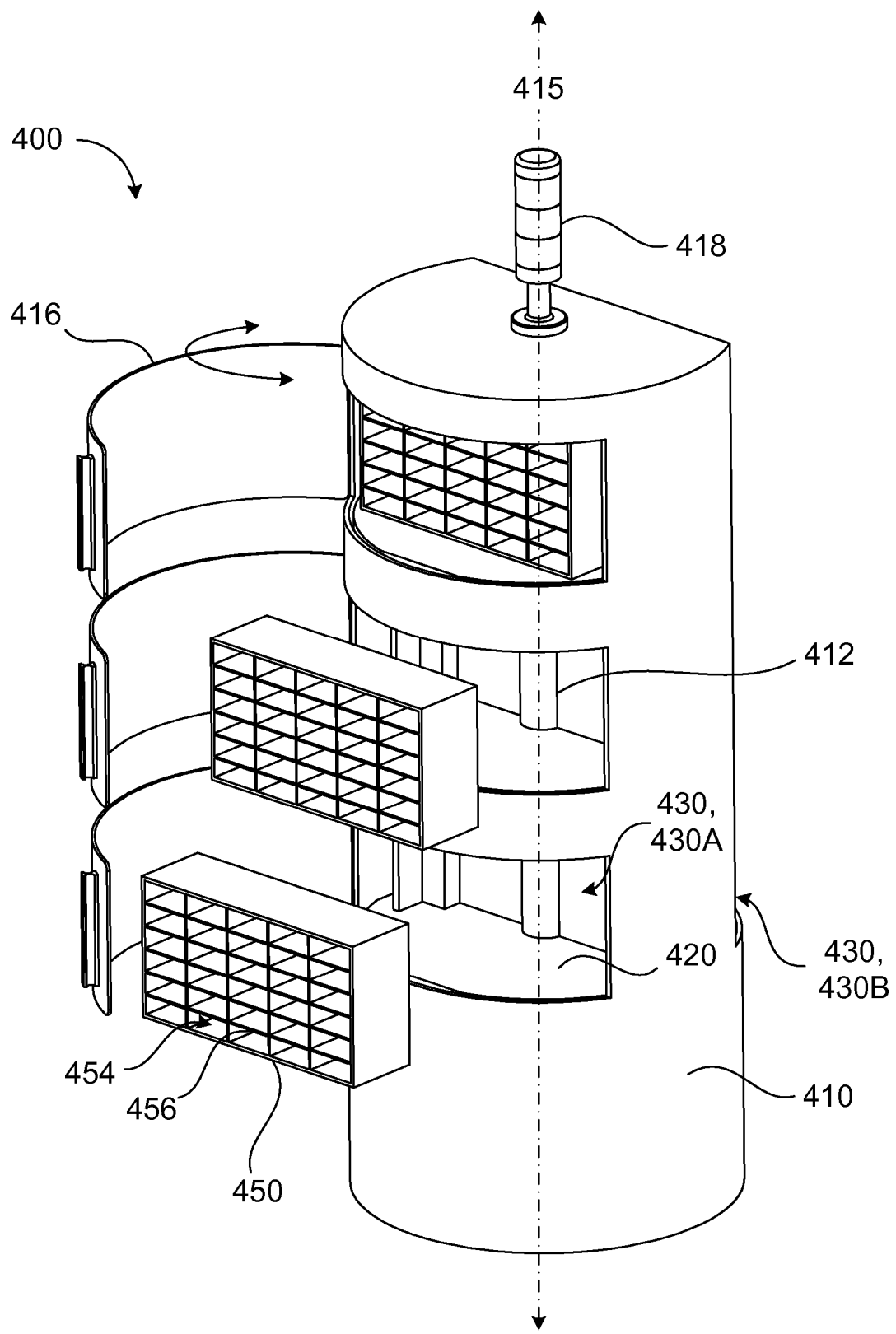
FIG. 10 is a perspective view of a transfer station.

Isolation of the free standing robotic arm 200 from the racks 300 aids vibration control of the racks 300, which only shares the floor surface 10 (see e.g. FIG. 10) as a common support structure. In other words, the robotic arm 200 is decoupled from the racks 300 and only shares the floor surface 10 as the only means of connection between the two structures. In some instances, each rack 300 houses about 480 test slots 310. In other instances, the racks 300 vary in size and test slot capacity.

In the examples illustrated in FIGS. 1-3, the racks 300 are arranged equidistantly radially away from the first axis 205 of the robotic arm 200. However, the racks 300 may be arranged in any pattern and at any distance around the robotic arm 200 within the working envelope volume 210. The racks 300 are arranged in at least a partially closed polygon about the first axis 205 of the robotic arm 200, such as an open or closed octagon, square, triangle, trapezoid, or other polygon, examples of which are shown in FIGS. 4-5. The racks 300 may be configured in different sizes and shapes to fit a particular footprint. The arrangement of racks 300 around the robotic arm 200 may be symmetric or asymmetric.

Figure 6:
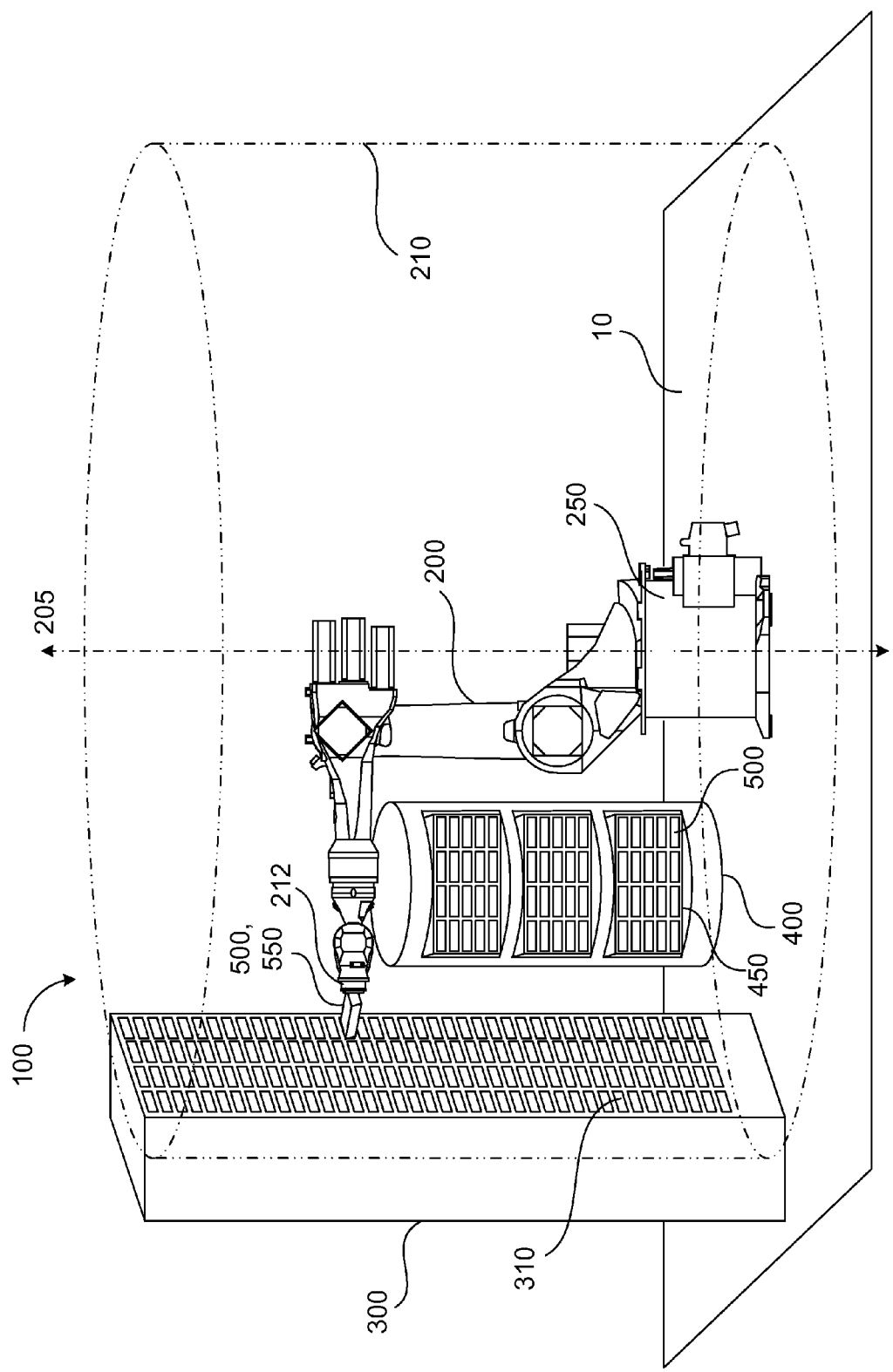
FIG. 6 is a perspective view of a disk drive testing system.
Figure 7:
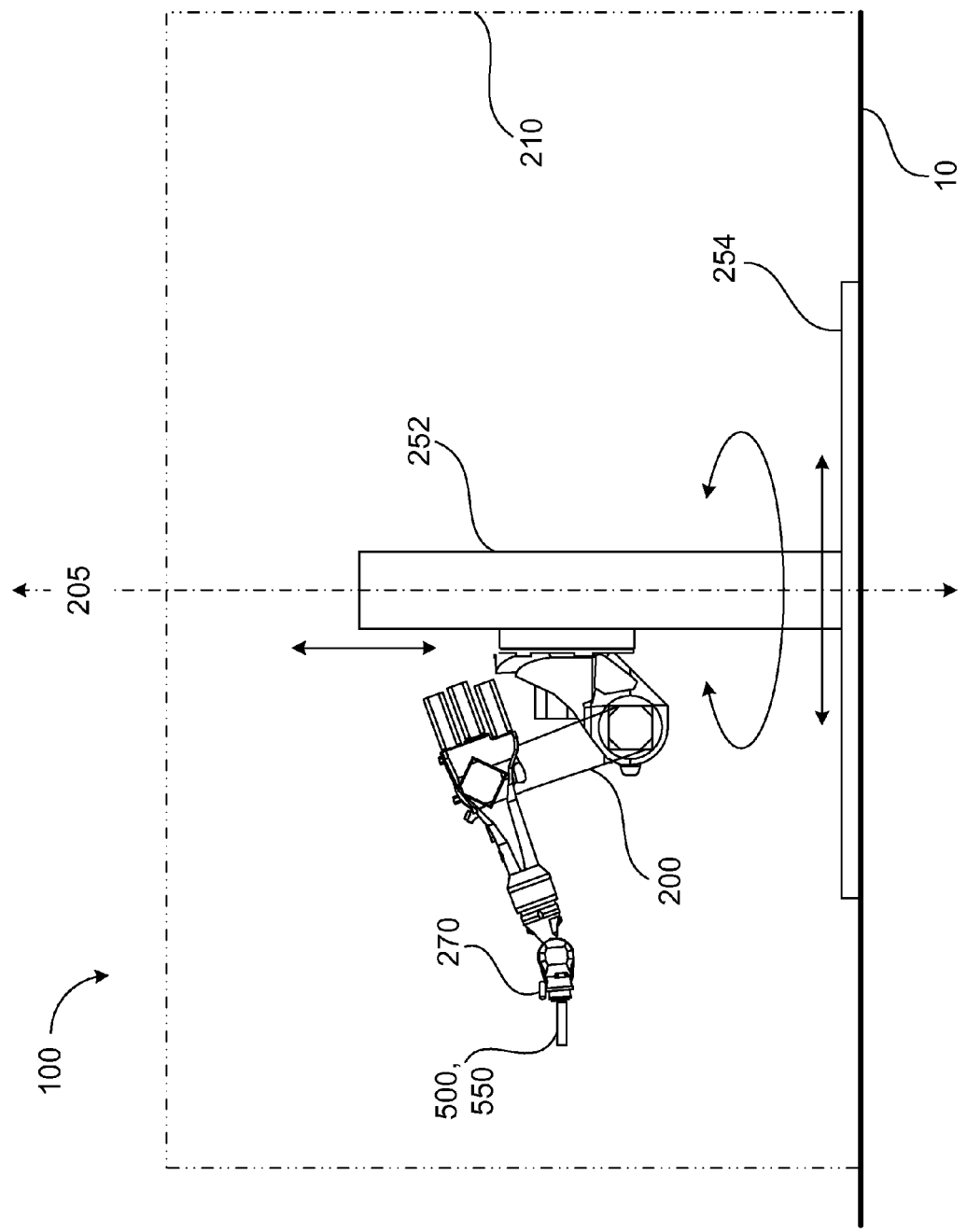
FIG. 7 is a side view of a robotic am supported on vertical and horizontal actuating supports.

In the example shown in FIGS. 3 and 6, the robotic arm 200 is elevated by and supported on a pedestal or lift 250 on the floor surface 10. The pedestal or lift 250 increases the height of the working envelope volume 210 by allowing the robotic arm 200 to reach not only upwardly, but also downwardly to service test slots 310. The height of the working envelope volume 210 can be further increased by adding a vertical actuator to the pedestal or lift 250, configuring it as a vertically actuating support 252 that supports the robotic arm 200, as shown in FIG. 7. The vertically actuating support 252 is operable to move the robotic arm 200 vertically with respect to the floor surface 10. In some examples, the vertically actuating support 252 is configured as a vertical track supporting the robotic arm 200 and includes an actuator (e.g. driven ball-screw or belt) to move the robotic arm 200 vertically along the track. A horizontally actuating support 254 (e.g. a linear actuator), also shown in FIG. 7, may be used to support the robotic arm 200 and be operable to move the robotic arm 200 horizontally along the floor surface 10. In the example shown, the combination of the vertically and horizontally actuating supports 252, 254 supporting the robotic arm 210 provides an enlarged working envelope volume 210 having an elongated substantially elliptical profile from a top view.

Figure 8:
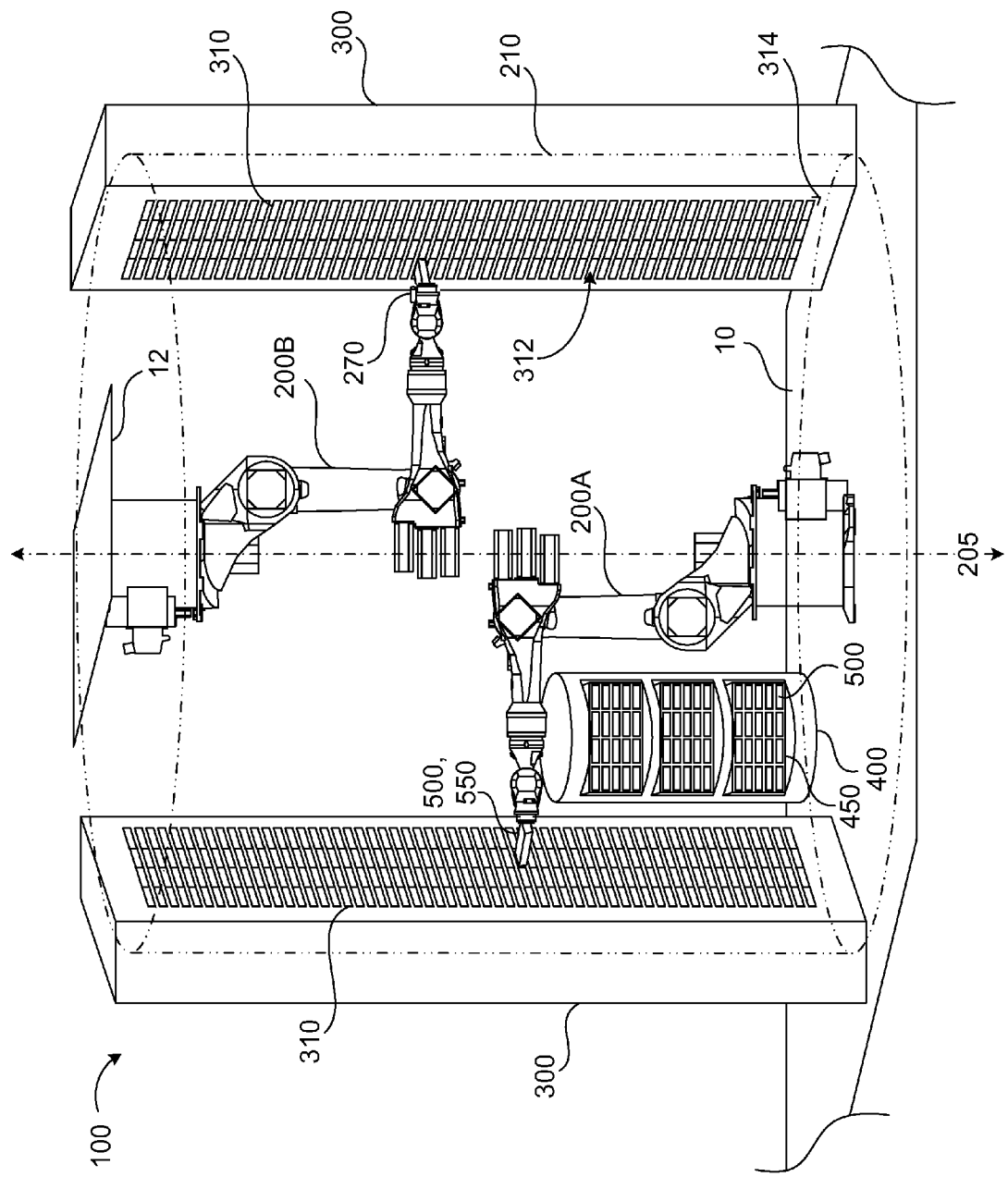
FIG. 8 is a perspective view of a disk drive testing system having two robotic arms.

In the example illustrated in FIG. 8, the disk drive testing system 100 includes two robotic arms 200A and 200B, both rotating about the first axis 205. One robotic arm 200A is supported on the floor surface 10, while the other robotic arm 200B is suspended from a ceiling structure 12. Similarly, in the example shown in FIG. 7, additional robotic arms 200 may be operational on the vertically actuating support 252.

Figure 9:
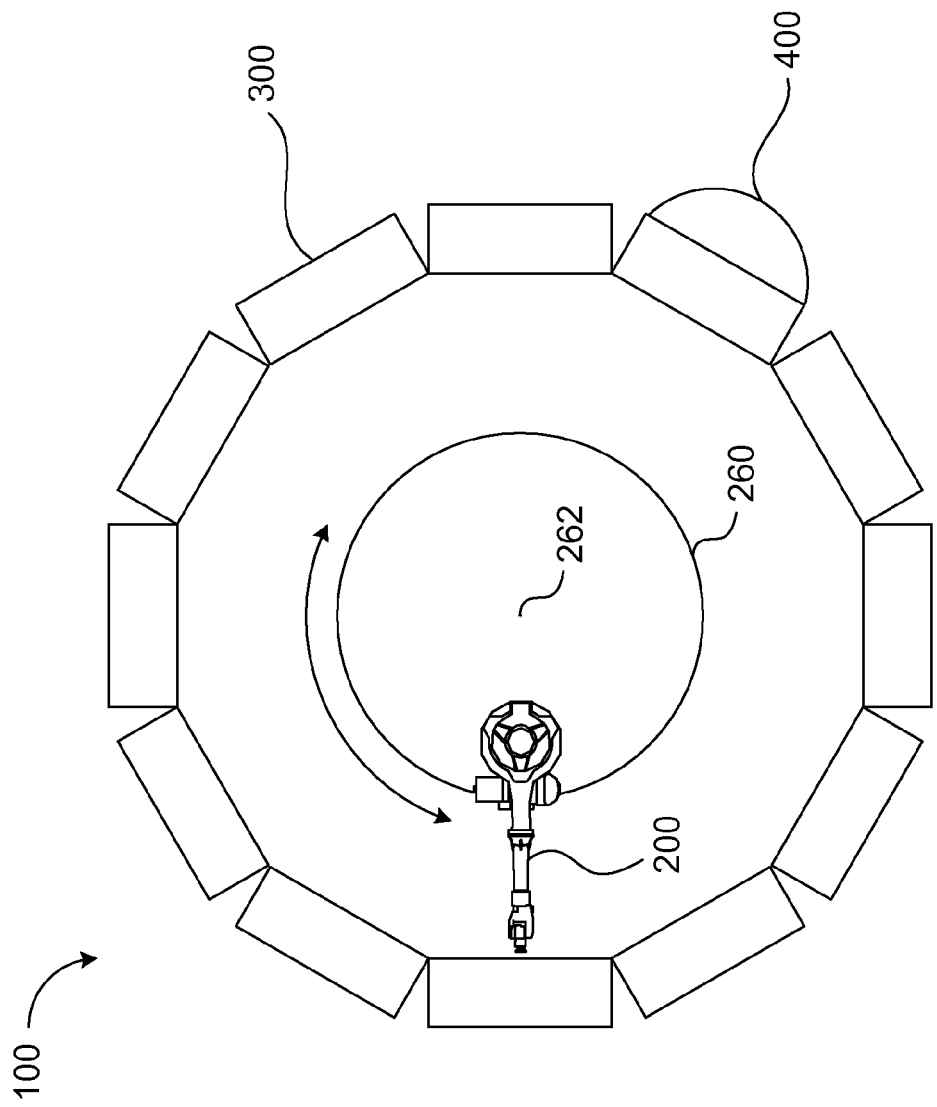
FIG. 9 is a top view of a disk drive testing system including a robotic arm supported on a rotating support.

In the example illustrated in FIG. 9, the disk drive testing system 100 includes a rotatable table 260 that supports the robotic arm 200. The rotatable table 260 is operable to rotate the robotic arm 200 about a second axis 262 substantially normal to the floor surface 10, thereby providing a larger working envelope volume 210 than a robotic arm 200 rotating only about the first axis 205.

Referring back to FIGS. 7-8, in some implementations, the disk drive testing system 100 includes a vision system 270 disposed on the robotic arm 200. The vision system 270 is configured to aid guidance of the robotic arm 200 while transporting a disk drive 500. In particular, the vision system 270 aids alignment of the disk drive transporter 550, held by the manipulator 212, for insertion in the test slot 310 and/or tote 450. The vision system 270 calibrates the robotic arm 200 by aligning the robotic arm 200 to a fiducial mark 314 on the rack 300, preferably the test slot 310. In some examples, the fiducial mark 314 is an "L" shaped mark located near a corner of an opening 312 of the test slot 310 on the rack 300. The robotic arm 200 aligns itself with the fiducial mark 314 before accessing the test slot 310 (e.g. to either pick-up or place a disk drive transporter 550, which may be carrying a disk drive 500). The continual robotic arm alignments enhances the accuracy and reputability of the robotic arm 200, while minimizing misplacement of a disk drive transporter 550 carrying a disk drive 500 (which may result in damage to the disk drive 500 and/or the disk drive testing system 100).

In some implementations, the disk drive testing system 100 includes a transfer station 400, as shown in FIGS. 1-3 and 10. While in other implementations, the disk drive testing system 100 include may include a conveyor belt (not shown) or an operator that feeds disk drives 500 to the robotic arm 200. In examples including a transfer station 400, the robotic arm 200 independently services each test slot 310 by transferring a disk drive 500 between the transfer station 400 and the test slot 310. The transfer station 400 includes multiple tote receptacles 430 configured to each receive a tote 450. The tote 450 defines disk drive receptacles 454 that house disk drives 500 for testing and/or storage. In each disk drive receptacle 454, the housed disk drive 500 is supported by a disk drive support 456. The robotic arm 200 is configured to remove a disk drive transporter 550 from one of the test slots 310 with the manipulator 212, then pick up a disk drive 500 from one the disk drive receptacles 454 at the transfer station 400 with the disk drive transporter 550, and then return the disk drive transporter 550, with a disk drive 500 therein, to the test slot 310 for testing of the disk drive 500. After testing, the robotic arm 200 retrieves the tested disk drive 500 from the test slot 310, by removing the disk drive transporter 550 carrying the tested disk drive 500 from the test slot 310 (i.e., with the manipulator 212), carrying the tested disk drive 500 in the disk drive transporter 550 to the transfer station 400, and manipulating the disk drive transporter 550 to return the tested disk drive 500 to one of the disk drive receptacles 454 at the transfer station 400. In implementations that include a vision system 270 on the robotic arm 200, the fiducial mark 314 may be located adjacent one or more disk drive receptacles 454 to aid guidance of the robotic arm in retrieving or depositing disk drives 500 at the transfer station 400.

The transfer station 400, in some examples, includes a station housing 410 that defines a longitudinal axis 415. One or more tote receivers 420 are rotatably mounted in the station housing 410, for example on a spindle 412 extending along the longitudinal axis 415. Each tote receiver 420 may rotate on an individual respective spindle 412 or on a common spindle 412. Each tote receiver 420 defines first and second opposite facing tote receptacles 430A and 430B. In the example shown, the transfer station 400 includes three tote receivers 420 stacked on the spindle 412. Each tote receiver 420 is independently rotatable from the other and may rotate a received disk drive tote 450 between a servicing position (e.g. accessible by an operator) and a testing position accessible by the robotic arm 200. In the example shown, each tote receiver 420 is rotatable between a first position (e.g. servicing position) and a second position (testing position). While in the first position, an operator is provided access to the first tote receptacle 430A, and the robotic arm 200 is provided access on the opposite side to the second tote receptacle 430B. While in the second position the robotic arm 200 is provided access the first tote receptacle 430A, and an operator is provided access on the opposite side to the second tote receptacles 430B. As a result, an operator may service the transfer station 400 by loading/unloading totes 450 into tote receptacles 430 on one side of the transfer station 400, while the robotic arm 200 has access to totes 450 housed in tote receptacles 430 on an opposite side of the transfer station 400 for loading/unloading disk drives 500.

The transfer station 400 provides a service point for delivering and retrieving disk drives 500 to and from the disk drive testing system 100. The totes 450 allow an operator to deliver and retrieve a batch of disk drives 500 to and from the transfer station 400. In the example shown in FIG. 10, each tote 450 that is accessible from respective tote receivers 420 in the second position may be designated as source totes 450 for supplying disk drives 500 for testing or as destination totes 450 for receiving tested disk drives 500. Destination totes 450 may be classified as "passed return totes" or "failed return totes" for receiving respective disk drives 500 that have either passed or failed a functionality test, respectively.

A housing door 416 is pivotally or slidably attached to the transfer station housing 410 and configured to provide operator access to one or more tote receptacles 430. An operator opens the housing door 416 associated with a particular tote receiver 420 to load/unload a tote 450 into the respective tote receptacle 430. The transfer station 400 may be configured to hold the respective tote receiver 420 stationary while the associated housing door 416 is open.

In some examples, the transfer station 400 includes a station indicator 418 which provides visual, audible, or other recognizable indications of one or more states of the transfer station 400. In one example, the station indicator 418 includes lights (e.g. LED's) that indicate when one or more tote receivers 420 need servicing (e.g. to load/unload totes 450 from particular tote receives 420). In another example, the station indicator 418 includes one or more audio devices to provide one or more audible signals (e.g. chirps, clacks, etc.) to signal an operator to service the transfer station 400. The station indicator 418 may be disposed along the longitudinal axis 415, as shown, or on some other portion of the station housing 410.

Figure 11:
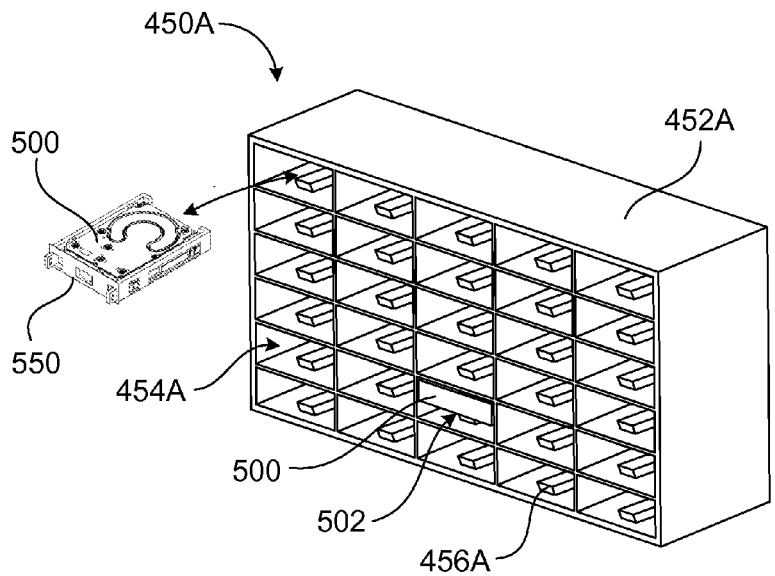
FIG. 11 is a perspective view of a tote defining multiple disk drive receptacles.

In the example illustrated in FIG. 11, a tote 450A includes a tote body 452A that defines multiple disk drive receptacles 454A. Each disk drive receptacle 454A is configured to house a disk drive 500. In this example, each disk drive receptacle 454A includes a disk drive support 456A configured to support a central portion 502 of the received disk drive 500 to allow manipulation of the disk drive 500 along non-central portions. To remove a housed disk drive 500 from the disk drive receptacle 454A, the disk drive transporter 550 is positioned below the disk drive 500 (e.g. by the robotic arm 200) in the disk drive receptacle 454A and elevated to lift the disk drive 500 off of the disk drive support 456A. The disk drive transporter 550 is then removed from the disk drive receptacle 454A while carrying the disk drive 500 for delivery to a destination target, such as a test slot 310.

Figure 12:
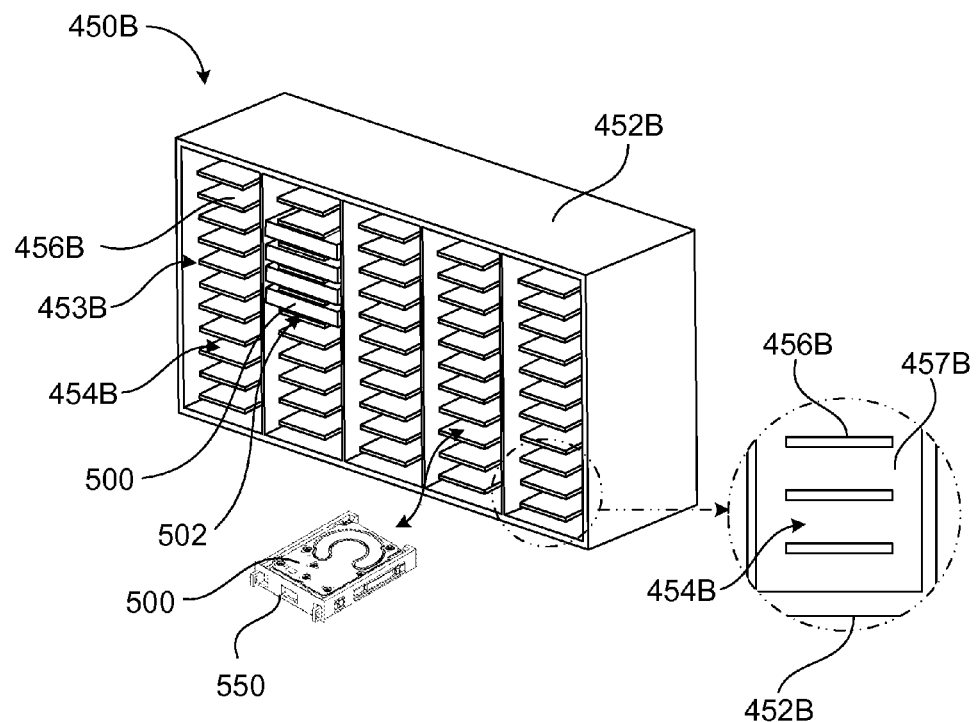
FIG. 12 is a perspective view of a tote having cantilevered disk drive supports.
Figure 13:
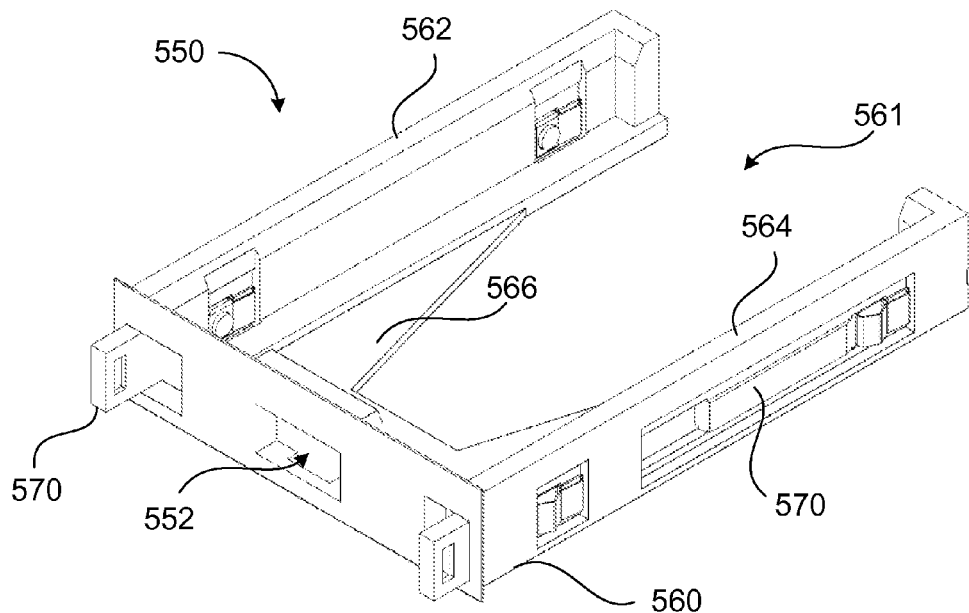
FIG. 13 is a perspective view of a disk drive transporter.
Figure 14:
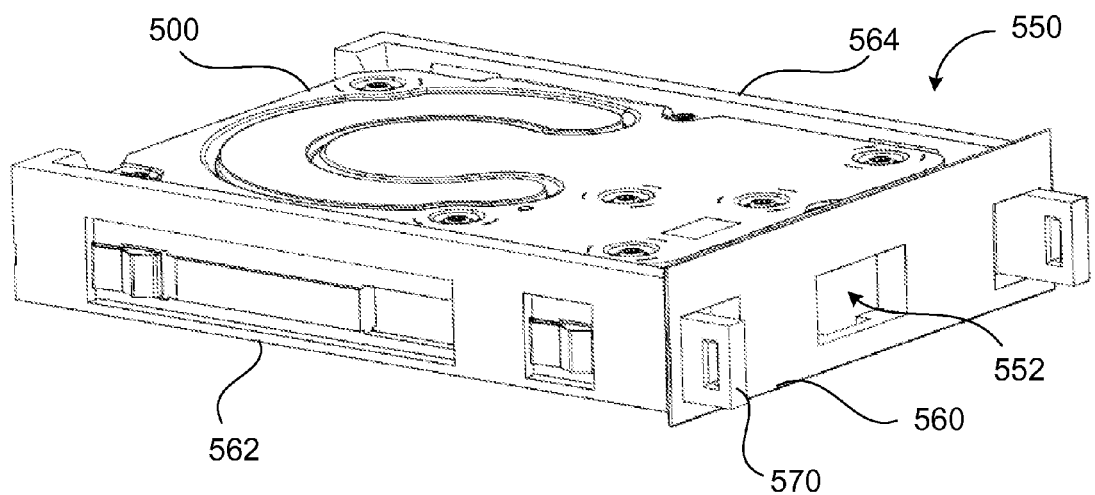
FIG. 14 is a perspective view of a disk drive transporter carrying a disk drive.
Figure 15:
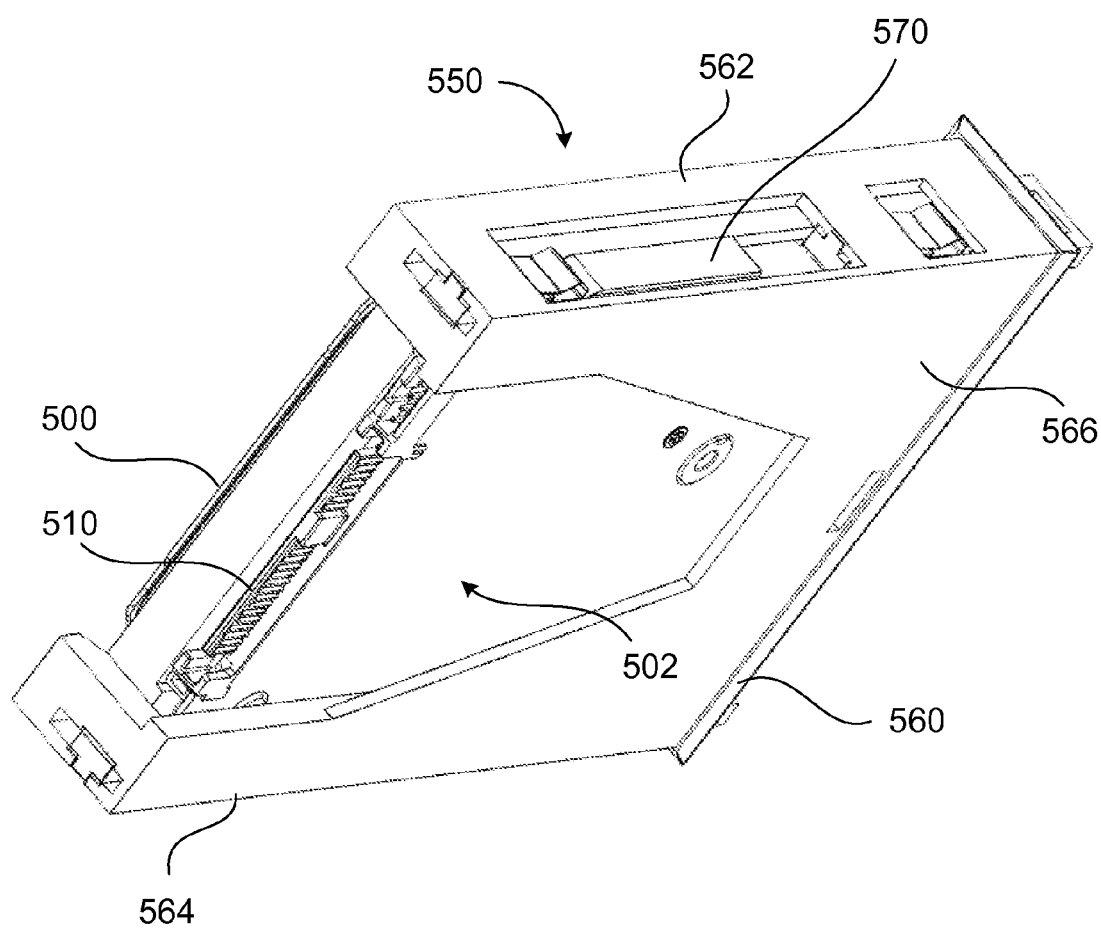
FIG. 15 is a bottom perspective view of a disk drive transporter carrying a disk drive.

In the example illustrated in FIG. 12, a tote 450B includes a tote body 452B that defines column cavities 453B divided into disk drive receptacles 454B by multiple disk drive supports 456B. The disk drive supports 456B are cantilevered off a rear wall 457B of the column cavity 453B. The disk drive supports 456B are configured to support a central portion 502 of the received disk drive 500 to allow manipulation of the disk drive 500 along non-central portions. The cantilevered disk drive supports 456B allow retrieval of disk drives 500 from the tote 450B by inserting a disk drive transporter 550 (e.g. as shown in FIG. 13) into an empty disk drive receptacle 454B just below and lifting the disk drive 500 off the disk drive support 456B for removal from the disk drive receptacle 454B. The same steps are repeated in reverse for depositing the disk drive 500 in the tote 450B. As shown, the bottom disk drive receptacle 454B in each column cavity 453B is left empty to facilitate removal of a disk drive 500 housed in the disk drive receptacle 454B above it. Consequently, the disk drives 500 must be loaded/unloaded in a sequential order in a particular column; however a greater storage density is achieved than the tote solution shown in FIG. 11.

Referring to FIGS. 13-16, in some examples, the test slot 310 is configured to receive the disk drive transporter 550. The disk drive transporter 550 is configured to receive the disk drive 500 and be handled by the robotic arm 200. In use, one of the disk drive transporters 550 is removed from one of the test slots 310 with the robot 200 (e.g., by grabbing, or otherwise engaging, the indentation 552 of the transporter 550 with the manipulator 212 of the robot 200). As illustrated in FIG. 13, the disk drive transporter 550 includes a frame 560 defining a substantially U-shaped opening 561 formed by sidewalls 562, 564 and a base plate 566 that collectively allow the frame 560 to fit around the disk drive support 456 in the tote 450 so that the disk drive transporter 550 can be moved (e.g., via the robotic arm 200) into a position beneath one of the disk drives 500 housed in one of the disk drive receptacles 454 of the tote 450. The disk drive transporter 550 can then be raised (e.g., by the robotic arm 310) into a position engaging the disk drive 600 for removal off of the disk drive support 456 in the tote 450.

Figure 16:
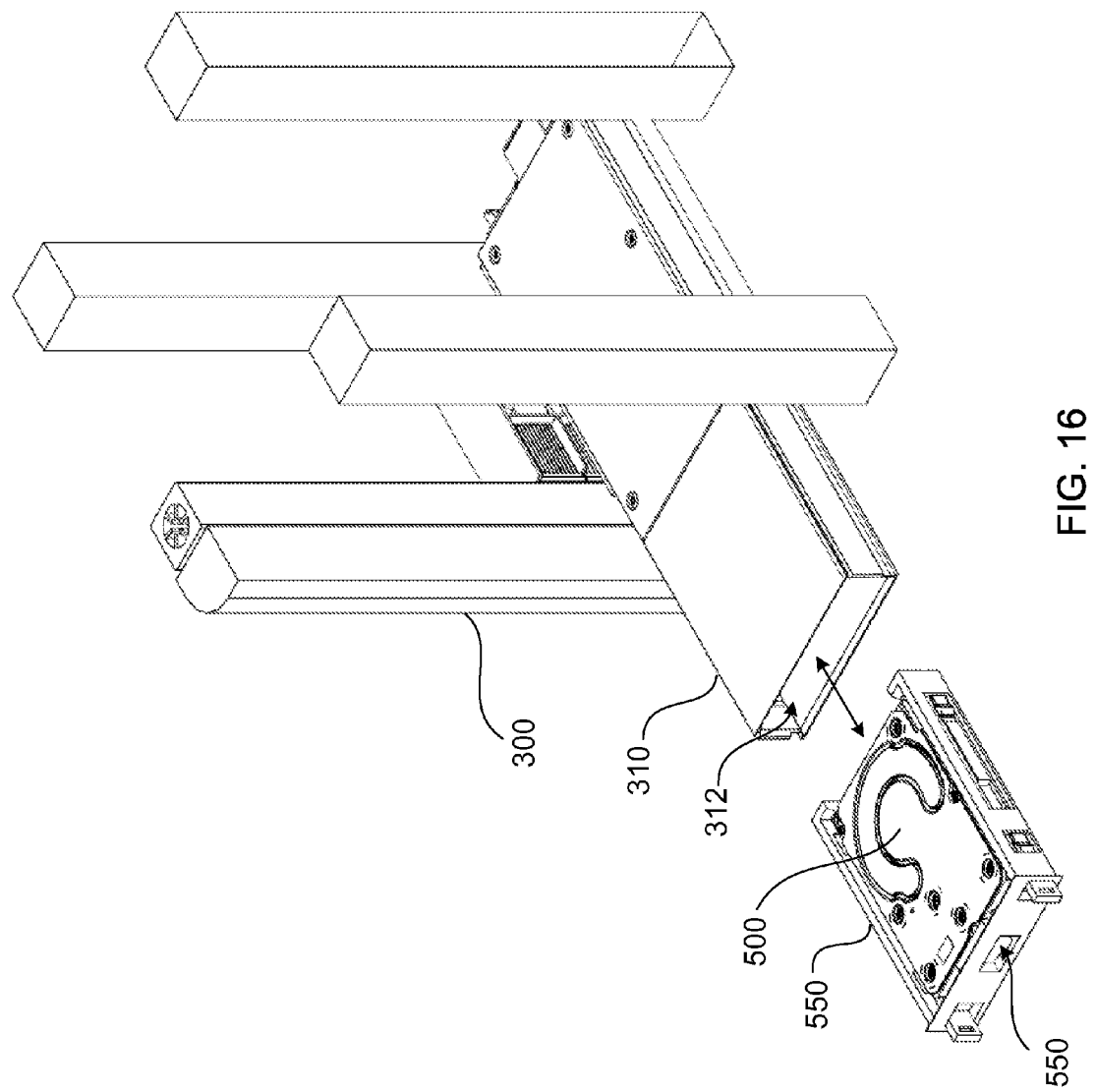
FIG. 16 is a perspective view of a disk drive transporter carrying a disk drive aligned for insertion into a test slot.

With the disk drive 500 in place within the frame 560 of the disk drive transporter 550, the disk drive transporter 550 and the disk drive 500 together can be moved by the robotic arm 200 for placement within one of the test slots 310, as shown in FIG. 16. The manipulator 212 is also configured to initiate actuation of a clamping mechanism 570 disposed in the disk drive transporter 550. This allows actuation of the clamping mechanism 570 before the transporter 550 is moved from the tote 450 to the test slot 310 to inhibit movement of the disk drive 500 relative to the disk drive transporter 550 during the move. Prior to insertion in the test slot 310, the manipulator 212 can again actuate the clamping mechanism 570 to release the disk drive 500 within the frame 560. This allows for insertion of the disk drive transporter 550 into one of the test slots 310, until the disk drive 500 is in a test position with a disk drive connector 510 engaged with a test slot connector (not shown). The clamping mechanism 570 may also be configured to engage the test slot 310, once received therein, to inhibit movement of the disk drive transporter 550 relative to the test slot 310. In such implementations, once the disk drive 500 is in the test position, the clamping mechanism 570 is engaged again (e.g., by the manipulator 212) to inhibit movement of the disk drive transporter 550 relative to the test slot 310. The clamping of the disk drive transporter 550 in this manner can help to reduce vibrations during testing. In some examples, after insertion, the disk drive transporter 550 and disk drive 500 carried therein are both clamped or secured in combination or individually within the test slot 310. A detailed description of the clamping mechanism 570 and other details and features combinable with those described herein may be found in the following U.S. patent application filed concurrently herewith, entitled "DISK DRIVE TRANSPORT, CLAMPING AND TESTING", inventors: Brian Merrow et al., and having assigned Ser. No. 11/959,133, the entire contents of the which are hereby incorporated by reference.

The disk drives 500 can be sensitive to vibrations. Fitting multiple disk drives 500 in a single test rack 310 and running the disk drives 500 (e.g., during testing), as well as the insertion and removal of the disk drive transporters 550, each optionally carrying a disk drive 500, from the various test slots 310 in the test rack 300 can be sources of undesirable vibration. In some cases, for example, one of the disk drives 500 may be operating under test within one of the test slots 310, while others are being removed and inserted into adjacent test slots 310 in the same test rack 300. Clamping the disk drive transporter 550 to the test slot 310 after the disk drive transporter 550 is fully inserted into the test slot 310, as described above, can help to reduce or limit vibrations by limiting the contact and scraping between the disk drive transporters 550 and the test slots 310 during insertion and removal of the disk drive transporters 550.

Figure 17:
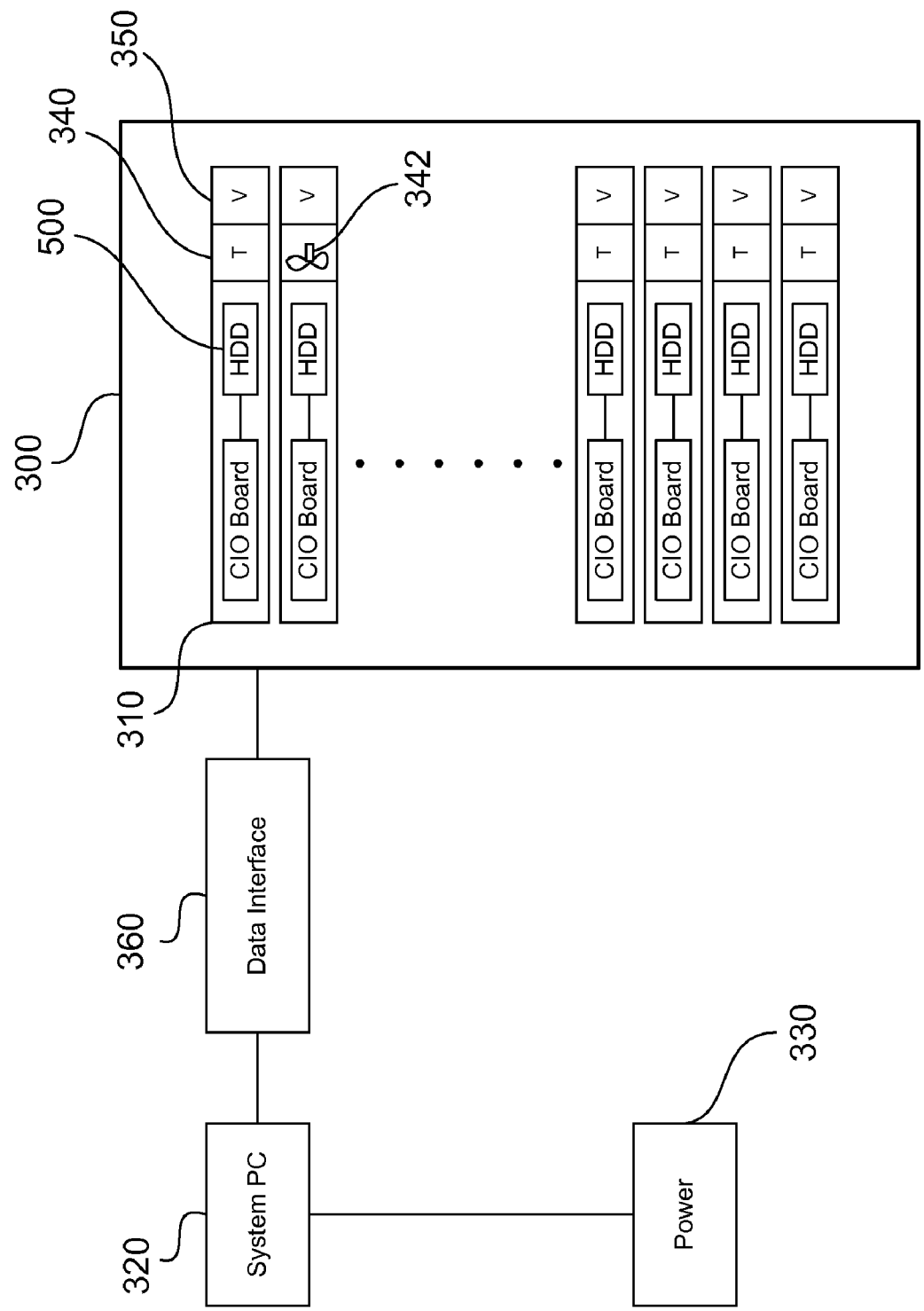
FIG. 17 is a schematic view of a disk drive testing system.

Referring to FIG. 17, in some implementations, the disk drive testing system 100 includes at least one computer 320 in communication with the test slots 310. The computer 320 may be configured to provide inventory control of the disk drives 500 and/or an automation interface to control the disk drive testing system 100. A power system 330 supplies power to the disk drive testing system 100. The power system 330 may monitor and/or regulate power to the received disk drive 500 in the test slot 310. A temperature control system 340 controls the temperature of each test slot 310. The temperature control system 340 may be an air mover 342 (e.g. a fan) operable to circulate air over and/or through the test slot 310. In some examples, the air mover 342 is located exteriorly of the test slot 310. A vibration control system 350, such as active or passive dampening, controls the vibration of each test slot 310. In some examples, the vibration control system 350 includes a passive dampening system where components of the test slot 310 are connected via grommet isolators (e.g. thermoplastic vinyl) and/or elastomeric mounts (e.g. urethane elastomer). In some examples, the vibration control system 350 includes an active control system with a spring, damper, and control loop that controls the vibrations in the rack 300 and/or test slot 310. A data interface 360 is in communication with each test slot 310. The data interface 360 is configured to communicate with a disk drive 500 received by the test slot 310.

Figure 18:
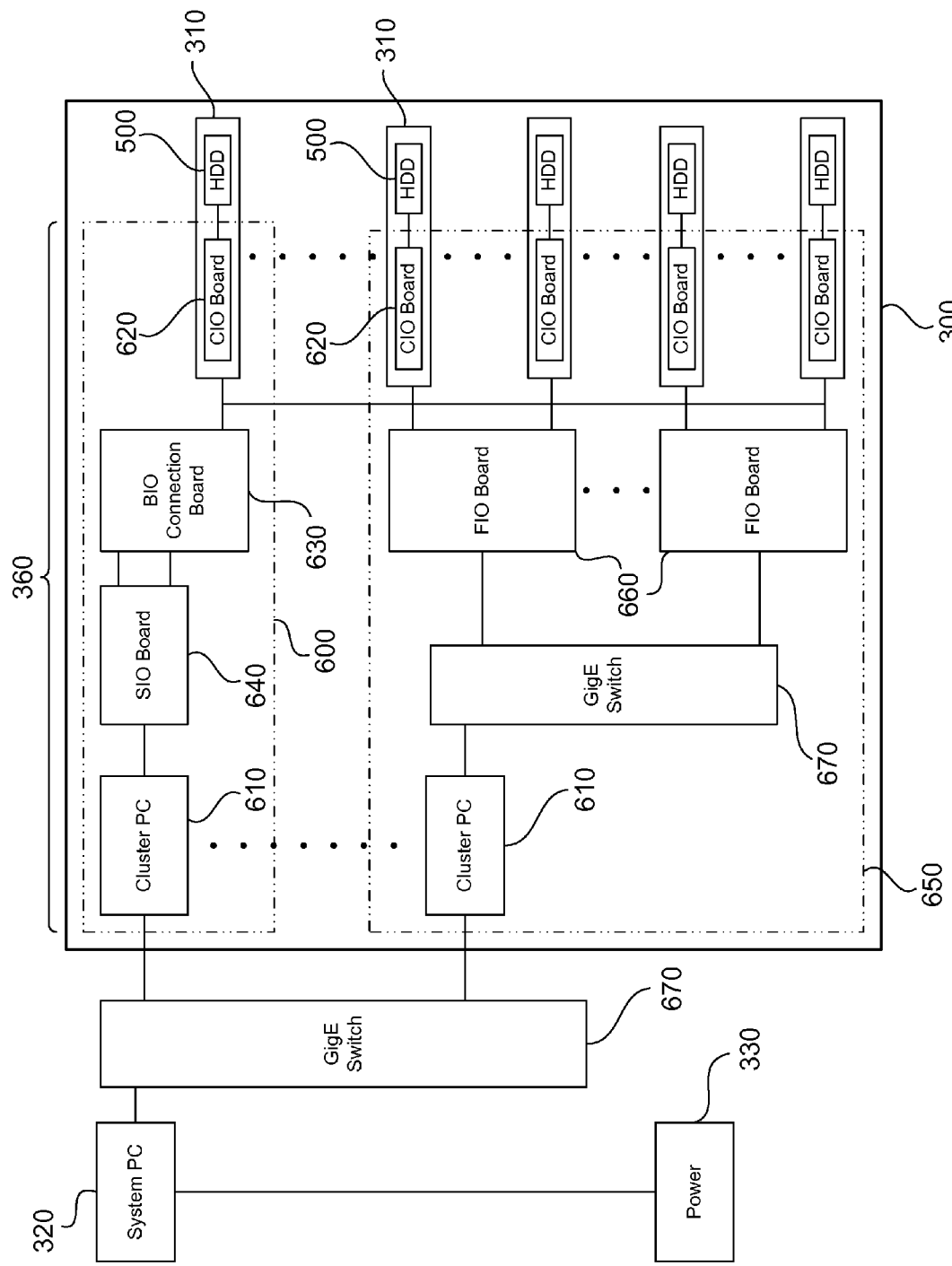
FIG. 18 is a schematic view of a disk drive testing system with self-testing and functional testing capabilities.

In the example illustrated in FIG. 18, each rack 300 includes at least one self-testing system 600 in communication with at least one test slot 310. The self-testing system 600 includes a cluster controller 610, a connection interface circuit 620 in electrical communication with a disk drive 500 received in the test slot 310, and a block interface circuit 630 in electrical communication with the connection interface circuit 620. The cluster controller 610 may be configured to run one or more testing programs, such as multiple self-tests on test slots 310 and/or functionality tests on disk drives 500. The connection interface circuit 620 and the block interface circuit 630 may be configured to self-test. However, in some examples, the self-testing system 600 includes a self-test circuit 660 configured to execute and control a self-testing routine on one or more components of the disk drive testing system 100. For example, the self-test circuit 660 may be configured to perform a 'disk drive' type and/or 'test slot only' type of self-test on one or more components of the disk drive testing system 100. The cluster controller 610 may communicate with the self-test circuit 640 via Ethernet (e.g. Gigabit Ethernet), which may communicate with the block interface circuit 630 and onto the connection interface circuit 620 and disk drive 500 via universal asynchronous receiver/transmitter (UART) serial links. A UART is usually an individual (or part of an) integrated circuit used for serial communications over a computer or peripheral device serial port. The block interface circuit 630 is configured to control power and temperature of the test slot 310, and may control multiple test slots 310 and/or disk drives 500.

Each rack 300, in some examples, includes at least one functional testing system 650 in communication with at least one test slot 310. The functional testing system 650 tests whether a received disk drive 500, held and/or supported in the test slot 310 by the disk drive transporter 550, is functioning properly. A functionality test may include testing the amount of power received by the disk drive 500, the operating temperature, the ability to read and write data, and the ability to read and write data at different temperatures (e.g. read while hot and write while cold, or vice versa). The functionality test may test every memory sector of the disk drive 500 or only random samplings. The functionality test may test an operating temperature of the disk drive 500 and also the data integrity of communications with the disk drive 500. The functional testing system 650 includes a cluster controller 610 and at least one functional interface circuit 660 in electrical communication with the cluster controller 610. A connection interface circuit 620 is in electrical communication with a disk drive 500 received in the test slot 310 and the functional interface circuit 660. The functional interface circuit 660 is configured to communicate a functional test routine to the disk drive 500. The functional testing system 650 may include a communication switch 670 (e.g. Gigabit Ethernet) to provide electrical communication between the cluster controller 610 and the one or more functional interface circuits 660. Preferably, the computer 320, communication switch 670, cluster controller 610, and functional interface circuit 660 communicate on an Ethernet network. However, other forms of communication may be used. The functional interface circuit 660 may communicate to the connection interface circuit 620 via Parallel AT Attachment (a hard disk interface also known as IDE, ATA, ATAPI, UDMA and PATA), SATA, or SAS (Serial Attached SCSI).

A method of performing disk drive testing includes loading multiple disk drives 500 into a transfer station 400 (e.g. as by loading the disk drives 500 into disk drive receptacles 454 defined by a disk drive tote 450, and loading the disk drive tote 450 into a tote receptacle 430 defined by the transfer station 400). The method includes actuating a robotic arm 200 to retrieve a disk drive transporter 550 from a test slot 310 housed in a rack 300, and actuating the robotic arm 200 to retrieve one of the disk drives 500 from the transfer station 400 and carry the disk drive 500 in the disk drive transporter 550. The robotic arm 200 is operable to rotate through a predetermined arc about, and to extend radially from, a first axis 205 defined by the robotic arm 200 substantially normal to a floor surface 10. The method includes actuating the robotic arm 200 to deliver the disk drive transporter 550 carrying the disk drive 500 to the test slot 310, and performing a functionality test on the disk drive 500 housed by the received disk drive transporter 550 and the test slot 310. The method then includes actuating the robotic arm 200 to retrieve the disk drive transporter 550 carrying the tested disk drive 500 from the test slot 310 and deliver the tested disk drive 500 back to the transfer station 400. In some implementations, the rack 300 and two or more associated test slots 310 are configured to move disk drives 500 internally from one test slot 310 to another test slot 310, in case the test slots 310 are provisioned for different kinds of tests.

In some examples, the method includes actuating the robotic arm 200 to deposit the disk drive transporter 550 in the test slot 310 after depositing the tested disk drive 500 in a disk drive receptacle 454 of the disk drive tote 450, or repeating the method by retrieving another disk drive 500 for testing from another disk drive receptacle 454 of the disk drive tote 450. In some examples, delivering the disk drive transporter 550 to the test slot 310 includes inserting the disk drive transporter 550 carrying the disk drive 500 into the test slot 310 in the rack 300, establishing an electric connection between the disk drive 500 and the rack 300.

In some implementations, the method includes performing a functionality test on the received disk drive 500 that includes regulating the temperature of the test slot 310 while operating the disk drive 500. Operation of the received disk drive 500 includes performing reading and writing of data to the disk drive 500. The method may also include circulating air over and/or through the test slot 310 to control the temperature of the test slot 310, and monitoring and/or regulating power delivered to the disk drive 500.

In some examples, the method includes performing a 'disk drive' type and/or 'test slot only' type of self-test on the test slot 320 with the self-testing system 600 housed by the rack 300 to verify the functionality of the test slot 310. The 'disk drive' type self-test tests the functionality of the disk drive testing system with a received disk drive 500, held and/or supported in the test slot 310 by the disk drive transporter 550. The 'test slot only' type of self-test tests the functionality of the test slot 310 while empty.

In some examples, the method includes communicating with the vision system 270 disposed on the robotic arm 200 to aid guidance of the robotic arm 200 while transporting the disk drive 500, which may be carried by a disk drive transporter 550. The method includes calibrating the robotic arm 200 by aligning the robotic arm 200 to a fiducial mark 314 on the rack 300, test slot 310, transfer station 400 and/or tote 450 recognized by the vision system 270.

Other details and features combinable with those described herein may be found in the following U.S. patent applications filed concurrently herewith, entitled "DISK DRIVE TESTING", inventors: Edward Garcia et al., and having assigned Ser. No. 11/958,817, the entire contents of the aforementioned applications are hereby incorporated by reference.

A number of implementations have been described. Nevertheless, it will be understood that various modifications may be made without departing from the spirit and scope of the disclosure. Accordingly, other implementations are within the scope of the following claims.

What is claimed is:

1. A disk drive testing system, comprising:
a robotic arm configured to rotate through a predetermined arc about, and to extend radially from, a first axis that is substantially normal to a floor surface and the robotic arm;
multiple racks arranged around the robotic arm for servicing by the robotic arm;
multiple test slots housed by at least one of the multiple racks, wherein a test slot is configured to receive a disk drive transporter configured to carry a disk drive for testing;
at least one computer configured to communicate with the multiple test slots;
a power system configured to supply power to the disk drive testing system;
a temperature control system configured to control a temperature of at least one of the multiple test slots;
a vibration control system configured to control rack vibrations;
a data interface configured to communicate with the disk drive in the disk drive transporter received by the test slot; and
a rotatable table supporting the robotic arm and configured to rotate the robotic arm about a second axis that is substantially normal to the floor surface.

2. The disk drive testing system of claim 1, wherein the power system is configured to monitor power to the disk drive received in the test slot.

3. The disk drive testing system of claim 1, wherein the power system is configured to regulate power to the disk drive received in the test slot.

4. The disk drive testing system of claim 1, wherein the temperature control system comprises an air mover configured to circulate air through the test slot.

5. A disk drive testing system, comprising:
a robotic arm configured to rotate through a predetermined arc about, and to extend radially from, an axis that is substantially normal to a floor surface and the robotic arm;
multiple racks arranged around the robotic arm for servicing by the robotic arm; and
multiple test slots housed by at least one of the multiple racks, wherein a test slot is configured to receive a disk drive transporter configured to carry a disk drive for testing;
wherein one of the multiple racks comprises at least one self-testing system configured to communicate with at least one test slot, the at least self-testing system comprising:
a cluster controller configured to run one or more testing programs on the disk drive received in the test slot;
a connection interface circuit configured to communicate with the disk drive received in the test slot; and
a block interface circuit configured to communicate with the connection interface circuit, and to control power and temperature of the test slot;
wherein one or more of the connection interface circuit and the block interface circuit are further configured to test a functionality of at least one component of the disk drive testing system.

6. A disk drive testing system, comprising:
a robotic arm configured to rotate through a predetermined arc about, and to extend radially from, an axis that is substantially normal to a floor surface and the robotic arm;
multiple racks arranged around the robotic arm for servicing by the robotic arm; and
multiple test slots housed by at least one of the multiple racks, wherein a test slot is configured to receive a disk drive transporter configured to carry a disk drive for testing;
wherein one of the multiple racks comprises at least one functional testing system configured to communicate with at least one test slot, the at least one functional testing system comprising:
a cluster controller configured to run one or more testing programs on the disk drive received in the test slot;
at least one functional interface circuit configured to communicate with the cluster controller; and
a connection interface circuit configured to communicate with the disk drive received in the test slot and the at least one functional interface circuit, wherein the at least one functional interface circuit is further configured to communicate a functional test routine to the disk drive.

7. The disk drive testing system of claim 6, wherein the at least one functional testing system further comprises an Ethernet switch configured to establish an electrical communication among the cluster controller and the at least one functional interface circuit.

8. A disk drive testing system, comprising:
a robotic arm configured to rotate through a predetermined arc about, and to extend radially from, a first axis that is substantially normal to a floor surface and the robotic arm;
multiple racks arranged around the robotic arm for servicing by the robotic arm;

multiple test slots housed by at least one of the multiple racks, wherein a test slot is configured to receive a disk drive transporter configured to carry a disk drive for testing; and a rotatable table supporting the robotic arm and configured to rotate the robotic arm about a second axis that is substantially normal to the floor surface.

9. The disk drive testing system of claim 8, wherein the robotic arm comprises a manipulator configured to engage the disk drive transporter, and the robotic arm is further configured to carry the disk drive in the disk drive transporter to the test slot for testing.

10. The disk drive testing system of claim 8, wherein the multiple racks are arranged equidistantly radially away from the first axis.

11. The disk drive testing system of claim 8, wherein the multiple racks are arranged in at least a partially closed polygon about the first axis.

12. The disk drive testing system of claim 8, wherein the robotic arm defines a substantially cylindrical working envelope volume, and the multiple racks are arranged within the working envelope volume for accessibility of each test slot for servicing by the robotic arm.

13. The disk drive testing system of claim 8, wherein the robotic arm independently services the test slot by retrieving the disk drive transporter from the test slot to transfer the disk drive between a transfer station and the test slot.

14. The disk drive testing system of claim 8, wherein the robotic arm is configured to rotate 360° about the first axis.

15. The disk drive testing system of claim 8, further comprising a vertically actuating support that supports the robotic arm and is configured to move the robotic arm vertically with respect to the floor surface.

16. The disk drive testing system of claim 8, further comprising a linear actuator for supporting the robotic arm and configured to move the robotic arm horizontally along the floor surface.

17. The disk drive testing system of claim 8, further comprising a transfer station arranged for servicing by the robotic arm, the transfer station configured to supply disk drives for testing.

18. A method of performing disk drive testing, the method comprising:
  loading multiple disk drives into a transfer station;
  actuating a robotic arm to retrieve a disk drive transporter from a test slot housed in a rack;
  actuating the robotic arm to retrieve a disk drive from the transfer station and to carry the disk drive in the disk drive transporter, the robotic arm configured to rotate through a predetermined arc about, and to extend radially from, a first axis that is substantially normal to a floor surface and the robotic arm;
  actuating the robotic arm to deliver the disk drive transporter carrying the disk drive to the test slot;
  performing a functionality test on the disk drive housed by the disk drive transporter and the test slot; and
  actuating the robotic arm to retrieve the disk drive transporter, carrying the disk drive, from the test slot and to deliver the disk drive to the transfer station;
  wherein the rack comprises:
    at least one computer configured to communicate with the test slot;
    a power system configured to supply power to the rack;
    a temperature control system configured to control a temperature of the test slot;
    a vibration control system configured to control rack vibrations;
    a data interface configured to communicate with the disk drive in the disk drive transporter received by the test slot; and
    a rotatable table supporting the robotic arm and configured to rotate the robotic arm about a second axis that is substantially normal to the floor surface.

19. The method of claim 18, further comprising actuating the robotic arm to deposit the disk drive transporter in the test slot.

20. The method of claim 18, wherein performing the functionality test on the disk drive comprises regulating the temperature of the test slot while operating the disk drive.

21. The method of claim 20, wherein operating the disk drive comprises performing reading and writing of data to the disk drive.

22. The method of claim 18, wherein the rack comprises a first rack and a second rack, each arranged equidistantly radially away from the axis.

23. The method of claim 18, wherein the rack comprises a first rack and a second rack, each arranged in at least a partially closed polygon about the first axis of the robotic arm.

24. The method claim 18, further comprising circulating air through the test slot to control the temperature of the test slot.

25. The method claim 18, further comprising monitoring power delivered to the disk drive.

26. The method claim 18, further comprising regulating power delivered to the disk drive.

27. The method claim 18, wherein the robotic arm is further configured to service the test slot by retrieving the disk drive transporter from the test slot to transfer the disk drive between the transfer station and the test slot.

28. The method claim 18, wherein the robotic arm is further configured to rotate 360° about the axis.

29. A method of performing disk drive testing, the method comprising:
  loading multiple disk drives into a transfer station;
  actuating a robotic arm to retrieve a disk drive transporter from a test slot housed in a rack;
  actuating the robotic arm to retrieve a disk drive from the transfer station and to carry the disk drive in the disk drive transporter, the robotic arm configured to rotate through a predetermined arc about, and to extend radially from, an axis that is substantially normal to a floor surface and the robotic arm;
  actuating the robotic arm to deliver the disk drive transporter carrying the disk drive to the test slot;
  performing a functionality test on the disk drive housed by the disk drive transporter and the test slot;
  actuating the robotic arm to retrieve the disk drive transporter, carrying the disk drive, from the test slot and to deliver the disk drive to the transfer station; and
  performing a self-test on the test slot with a self-testing system housed by the rack to verify a functionality of the test slot;
  wherein the self-testing system comprises:
    a cluster controller configured to run one or more testing programs on the disk drive received in the test slot;
    a connection interface circuit configured to communicate with the disk drive received in the test slot; and
    a block interface circuit configured to communicate with the connection interface circuit, and to control power and temperature of the test slot;
    wherein one or more of the connection interface circuit and the block interface circuit are further configured to test a functionality of at least one component of the disk drive testing system.

30. A method of performing disk drive testing, the method comprising:

loading multiple disk drives into a transfer station;

actuating a robotic arm to retrieve a disk drive transporter from a test slot housed in a rack;

actuating the robotic arm to retrieve a disk drive from the transfer station and to carry the disk drive in the disk drive transporter, the robotic arm configured to rotate through a predetermined arc about, and to extend radially from, an axis that is substantially normal to a floor surface and the robotic arm;

actuating the robotic arm to deliver the disk drive transporter carrying the disk drive to the test slot;

performing a functionality test on the disk drive housed by the disk drive transporter and the test slot; and actuating the robotic arm to retrieve the disk drive transporter, carrying the disk drive, from the test slot and to deliver the disk drive to the transfer station;

wherein the rack comprises at least one functional testing system configured to perform the functionality test on the disk drive, the at least one functional testing system comprising:

a cluster controller configured to run one or more testing programs on the disk drive received in the test slot;

at least one functional interface circuit configured to communicate with the cluster controller; and a connection interface circuit configured to communicate with the disk drive received in the test slot and the at least one functional interface circuit, wherein the at least one functional interface circuit is further configured to communicate a functional test routine to the disk drive.

31. The method claim 30, wherein the at least one functional testing system further comprises an Ethernet switch configured to establish an electrical communication between the cluster controller and the at least one functional interface circuit.

* * * * *